(12) United States Patent
Gohshi

(10) Patent No.: US 8,427,256 B2
(45) Date of Patent: Apr. 23, 2013

(54) WAVEFORM SHAPING DEVICE, EQUALIZER, RECEIVING SYSTEM, METHOD OF CONTROLLING WAVEFORM SHAPING DEVICE, CONTROL PROGRAM, AND COMPUTER-READABLE MEDIUM IN WHICH CONTROL PROGRAM IS RECORDED

(75) Inventor: Seiichi Gohshi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/377,907

(22) PCT Filed: Jan. 22, 2010

(86) PCT No.: PCT/JP2010/000372
§ 371 (c)(1), (2), (4) Date: Dec. 13, 2011

(87) PCT Pub. No.: WO2010/146728
PCT Pub. Date: Dec. 23, 2010

(65) Prior Publication Data
US 2012/0081198 A1    Apr. 5, 2012

(30) Foreign Application Priority Data
Jun. 16, 2009 (JP) ................. 2009-143609

(51) Int. Cl.
*H03H 7/30* (2006.01)
*H03F 3/45* (2006.01)
(52) U.S. Cl.
USPC ....................... 333/28 R; 327/229

(58) Field of Classification Search ............... 333/28 R, 333/18; 327/100, 306; 375/229, 230
See application file for complete search history.

(56) References Cited

U.S. PATENT DOCUMENTS

| 7,633,354 B2 * | 12/2009 | Kuijk et al. ................ 333/28 R |
| 2007/0140387 A1 | 6/2007 | Wong et al. |
| 2007/0147478 A1 | 6/2007 | Lai et al. |

FOREIGN PATENT DOCUMENTS

| JP | 11340878 A | 12/1999 |
| JP | 2005191895 A | 7/2005 |
| JP | 2007174637 A | 7/2007 |
| WO | WO-2010113342 A1 | 10/2010 |

OTHER PUBLICATIONS

International Search Report and Written Opinion of Searching Authority.

* cited by examiner

*Primary Examiner* — Stephen Jones
(74) *Attorney, Agent, or Firm* — Harness, Dickey & Pierce, P.L.C.

(57) ABSTRACT

A waveform shaping device shapes a waveform of an externally input signal and outputs the input signal with the shaped waveform as an output signal to an equalizer for compensating a distortion of a signal, and includes a nonlinear process section for generating a nonlinear process signal (i) in which positive and negative signs of a low-frequency-free signal obtained by removing at least a direct current component from frequency components of the externally input signal are retained and (ii) which broadly monotonically increases nonlinearly with respect to the low-frequency-free signal when values of the low-frequency-free signal are at least in the vicinity of 0, the nonlinear process signal being added to the low-frequency-free signal so as to generate the input signal.

30 Claims, 19 Drawing Sheets

WAVEFORM SHAPING DEVICE, EQUALIZER, RECEIVING SYSTEM, METHOD OF CONTROLLING WAVEFORM SHAPING DEVICE, CONTROL PROGRAM, AND COMPUTER-READABLE MEDIUM IN WHICH CONTROL PROGRAM IS RECORDED

TECHNICAL FIELD

The present invention relates to a waveform shaping device for shaping the waveform of a signal, an equalizer, a receiving system, a method of controlling the waveform shaping device, a method of controlling the equalizer, a control program, and a computer-readable medium in which the control program is recorded.

BACKGROUND ART

Recently, with prevalence of the Internet, mobile phones, digital broadcasting etc., digital communications in which digital signals are transmitted and received are widely carried out. When digital communications are carried out via a transmission path, waveform distortions such as intersymbol interference occur due to transmission properties of the transmission path. In order to deal with this problem, equalizers for compensating waveform distortions have been used conventionally.

In general, equalizers having been used conventionally (hereinafter referred to as conventional equalizers) compensate waveform distortions based on linear operation. Specifically, as shown in FIG. 19, most equalizers include transversal linear filters for calculating a linearly weighted sum of a received signal. Linear filters shown in FIG. 19 are s-tap linear filters (s indicates a positive integer of 3 or greater). That is, each linear filter in FIG. 19 includes s−1 unit delay elements Dt (t=1, 2, . . . , and s−1), s multiplication sections Mu (u=1, 2, . . . , and s), and an addition section ADD.

Further, in a case where transmission properties change temporally, adaptive equalizers which learn a coefficient Cu (u=1, 2, . . . , and s) of a multiplication section Mu in accordance with the transmission properties are used generally.

As for a technique relating to equalizers, Patent Literature 1 discloses a technique for compensating group delay distortions by using a phase equalizer. The technique disclosed in Patent Literature 1 is a kind of a method for demodulating a modulated signal having group delay distortions, designed to learn phase variation history and phase errors based on information regarding a received signal point so as to correct phase distortion.

CITATION LIST

Patent Literatures

[Patent Literature 1]
Japanese Patent Application Publication, Tokukaihei, No. 11-340878 (published on Dec. 10, 1999)

SUMMARY OF INVENTION

Technical Problem

As shown in FIG. 19, conventional equalizers compensate waveform distortions based on linear operation. Accordingly, in order that the conventional equalizers have higher ability to compensate waveform distortions, the number of taps (the number of multiplication sections Mu (u=1, 2, . . . , and s) shown in FIG. 19) is required to be increased. Consequently, in a case of nonlinear distortions for example, the number of taps is required to be increased.

Consequently, the conventional equalizers suffer a problem that the number of taps is in the order of hundreds, which requires larger circuits. Further, in a case where nonlinear distortions are large, there is a possibility that the conventional equalizers cannot compensate waveform distortions sufficiently.

The method disclosed in Patent Literature 1 is also a one which corrects phase distortions based on linear operation.

The present invention was made in view of the foregoing problems. An object of the present invention is to provide a waveform shaping device etc. for shaping, with a simple configuration, the waveform of a signal.

Solution to Problem

In order to solve the foregoing problem, a waveform shaping device of the present invention is a waveform shaping device, which shapes a waveform of an externally input signal and outputs the input signal with the shaped waveform as an output signal to distortion compensation means, positioned outside, for compensating a distortion of a signal, the waveform shaping device including: low-frequency component removing means for removing at least a direct current component from frequency components of the input signal so as to generate a low-frequency-free signal; nonlinear process means for generating a nonlinear process signal (i) in which positive and negative signs of the low-frequency-free signal are retained and (ii) which broadly monotonically increases nonlinearly with respect to the low-frequency-free signal when values of the low-frequency-free signal are at least in the vicinity of 0; and addition means for adding the nonlinear process signal to the input signal so as to generate the output signal.

In order to solve the foregoing problem, a method of the present invention of controlling a waveform shaping device is a method of controlling a waveform shaping device which shapes a waveform of an externally input signal and outputs the input signal with the shaped waveform as an output signal to distortion compensation means, positioned outside, for compensating a distortion of a signal, the method comprising the steps of: removing at least a direct current component from frequency components of the input signal so as to generate a low-frequency-free signal; generating a nonlinear process signal (i) in which positive and negative signs of the low-frequency-free signal are retained and (ii) which broadly monotonically increases nonlinearly with respect to the low-frequency-free signal when values of the low-frequency-free signal are at least in the vicinity of 0; and adding the nonlinear process signal to the input signal so as to generate the output signal.

With the arrangement, at least the direct component is removed from frequency components of the externally input signal so as to generate the low-frequency-free signal. Subsequently, the nonlinear process signal (i) in which positive and negative signs of the low-frequency-free signal are retained and (ii) which broadly monotonically increases nonlinearly with respect to the low-frequency-free signal when values of the low-frequency-free signal are at least in the vicinity of 0. The output signal is generated by adding the nonlinear process signal to the low-frequency-free signal. The output signal is outputted to the distortion compensation means provided outside for compensating the distortion of a signal.

Consequently, a signal obtained by subjecting high-frequency components in the input signal to the nonlinear process can be generated as the output signal, and the output signal thus generated can be outputted to the distortion compensation means provided outside for compensating the distortion of a signal.

The output signal is generated by adding, for example, the low-frequency-free signal and the nonlinear process signal obtained by subjecting the low-frequency-free signal to the nonlinear process such as squaring the low-frequency-free signal. It should be noted that positive and negative signs of the output signal are the same as those of the low-frequency-free signal.

The output signal thus generated includes a high frequency component which has not been included in the original frequency component. Consequently, the generated output signal includes a frequency component whose frequencies are higher than the Nyquist frequency which is the half of a sampling frequency when the input signal is made discrete. In contrast thereto, the conventional process of subjecting an input signal to linear operation cannot compensate a high frequency range higher than the Nyquist frequency.

Accordingly, the waveform shaping device of the present invention can generate an output signal with steeper rising and falling corresponding to edges of an input signal, compared with a process of subjecting an input signal to linear operation.

Here, it is assumed that the input signal inputted to the waveform shaping device is a signal transmitted from a transmission device via a transmission path and is a signal on which a clock signal is overlapped. Further, it is assumed that the distortion compensation means provided outside which is a destination of the output signal is an equalizer which includes a general transversal linear filter and which carries out a process of extracting a clock signal from the output signal and reproducing a clock and a process of compensating waveform distortion of a signal due to transmission properties of the transmission path.

In this case, even when a rising part of the clock signal included in the input signal is difficult to be identified, the waveform shaping device makes rising and falling of a signal steeper. Accordingly, the distortion compensation means serving as an equalizer at a stage posterior to the waveform shaping device can reproduce an accurate clock having rising and falling with accurate timing. When the clock can be reproduced accurately, the distortion compensation means serving as an equalizer can sufficiently compensate waveform distortion even if the number of taps in the distortion compensation means is small. That is, when the clock can be reproduced accurately, the number of taps in the distortion compensation means serving as an equalizer may be smaller than that of a case where waveform distortion is compensated only by a normal transversal equalizer.

Accordingly, the present invention yields an effect of downsizing distortion compensation means at a stage posterior to a waveform shaping device and making the distortion compensation means less expensive, and reducing a process load on the waveform shaping device.

Further, even in a case where distortion which is so large that a normal transversal equalizer alone cannot sufficiently compensate is caused due to phase distortion, phasing etc., the waveform shaping device causes a signal to rise and fall sharply beforehand as described above, so that a clock can be reproduced in the distortion compensation means (equalizer) at a later stage. As a result, waveform distortion can be compensated.

Further, a relay device such as a switch and switching equipment on a communication path may include the waveform shaping device of the present invention and the distortion compensation means (equalizer) at a later stage. In this case, the relay device can sufficiently compensate waveform distortion by using the waveform shaping device and the distortion compensation means (equalizer), similarly with the above. Consequently, the number of the relay devices including the waveform shaping device of the present invention on the communication path can be smaller than the number of relay devices without the waveform shaping device of the present invention. This yields, for example, an effect of reducing costs for providing and maintaining relay devices on the communication path.

In order to solve the foregoing problem, a waveform shaping device of the present invention is a waveform shaping device, which shapes a waveform of an input signal from distortion compensation means positioned outside for compensating a distortion of a signal and outputs the input signal with the shaped waveform as an output signal, the waveform shaping device including: low-frequency component removing means for removing at least a direct current component from frequency components of the input signal so as to generate a low-frequency-free signal; nonlinear process means for generating a nonlinear process signal (i) in which positive and negative signs of the low-frequency-free signal are retained and (ii) which broadly monotonically increases nonlinearly with respect to the low-frequency-free signal when values of the low-frequency-free signal are at least in the vicinity of 0; and addition means for adding the nonlinear process signal to the input signal so as to generate the output signal.

In order to solve the foregoing problem, a method of the present invention of controlling a waveform shaping device is a method of controlling a waveform shaping device which shapes a waveform of an input signal from distortion compensation means positioned outside for compensating a distortion of a signal and outputs the input signal with the shaped waveform as an output signal, the method including the steps of: removing at least a direct current component from frequency components of the input signal so as to generate a low-frequency-free signal; generating a nonlinear process signal (i) in which positive and negative signs of the low-frequency-free signal are retained and (ii) which broadly monotonically increases nonlinearly with respect to the low-frequency-free signal when values of the low-frequency-free signal are at least in the vicinity of 0; and adding the nonlinear process signal to the input signal so as to generate the output signal.

With the arrangement, at least the direct component is removed from frequency components of the input signal from the distortion compensation means provided outside for compensating distortion of a signal, so as to generate the low-frequency-free signal. Subsequently, the nonlinear process signal (i) in which positive and negative signs of the low-frequency-free signal are retained and (ii) which broadly monotonically increases nonlinearly with respect to the low-frequency-free signal when values of the low-frequency-free signal are at least in the vicinity of 0. The output signal is generated by adding the nonlinear process signal to the low-frequency-free signal.

Consequently, a signal obtained by subjecting high-frequency components in the input signal from the outside distortion compensation means to the nonlinear process can be outputted as an output signal.

The output signal is generated by adding, for example, the low-frequency-free signal and the nonlinear process signal obtained by subjecting the low-frequency-free signal to the nonlinear process such as squaring the low-frequency-free signal. It should be noted that positive and negative signs of the output signal are the same as those of the low-frequency-free signal.

The output signal thus generated includes a high frequency component which has not been included in the original frequency component. Consequently, the generated output signal includes a frequency component whose frequencies are higher than the Nyquist frequency which is the half of a sampling frequency when the input signal is made discrete.

In contrast thereto, the conventional process of subjecting an input signal to linear operation cannot compensate a high frequency range higher than the Nyquist frequency.

Accordingly, the waveform shaping device of the present invention can generate a signal with steeper rising and falling corresponding to edges of an input signal, compared with a process of subjecting an input signal to linear operation.

Here, it is assumed that the signal whose distortion has been compensated by the outside distortion compensation means is a signal transmitted from a transmission device via a transmission path and is a signal on which a clock signal is overlapped. Further, it is assumed that the outside distortion compensation means is an equalizer which includes a general transversal linear filter and which carries out a process of extracting a clock signal from the output signal and reproducing a clock and a process of compensating waveform distortion of a signal due to transmission properties of the transmission path.

In this case, even when the equalizer serving as the distortion compensation means provided at a stage prior to the waveform shaping device cannot sufficiently compensate waveform distortion of a signal (i.e. when waveform distortion remains after the distortion compensation process), the waveform shaping device at the later stage makes rising and falling of the signal steeper, so that the waveform distortion can be compensated sufficiently.

Consequently, even in a case where the equalizer serving as the distortion compensation means does not include sufficient number of taps for compensating waveform distortion of a signal, the waveform shaping device at a later stage can sufficiently compensate the waveform distortion. That is, the number of taps in the equalizer serving as the distortion compensation means is not required to be as large as the number of taps required for a transversal equalizer alone to compensate waveform distortion.

Accordingly, the present invention yields an effect of downsizing distortion compensation means at a stage prior to a waveform shaping device and making the distortion compensation means less expensive, and reducing a process load on the distortion compensation means.

Further, even in a case where distortion which is so large that a normal transversal equalizer alone cannot sufficiently compensate is caused due to phase distortion, phasing etc., the waveform shaping device at a stage posterior to the distortion compensation means (equalizer) causes a signal to rise and fall sharply as described above, so that waveform distortion can be compensated.

Further, a relay device such as a switch and switching equipment on a communication path may include the waveform shaping device of the present invention and the distortion compensation means (equalizer) at a former stage. In this case, the relay device can sufficiently compensate waveform distortion by using the distortion compensation means (equalizer) and the waveform shaping device, similarly with the above. Consequently, the number of the relay devices including the waveform shaping device of the present invention on the communication path can be smaller than the number of relay devices without the waveform shaping device of the present invention. This yields, for example, an effect of reducing costs for providing and maintaining relay devices on the communication path.

For a fuller understanding of the nature and advantages of the invention, reference should be made to the ensuing detailed description taken in conjunction with the accompanying drawings.

Figure 1:
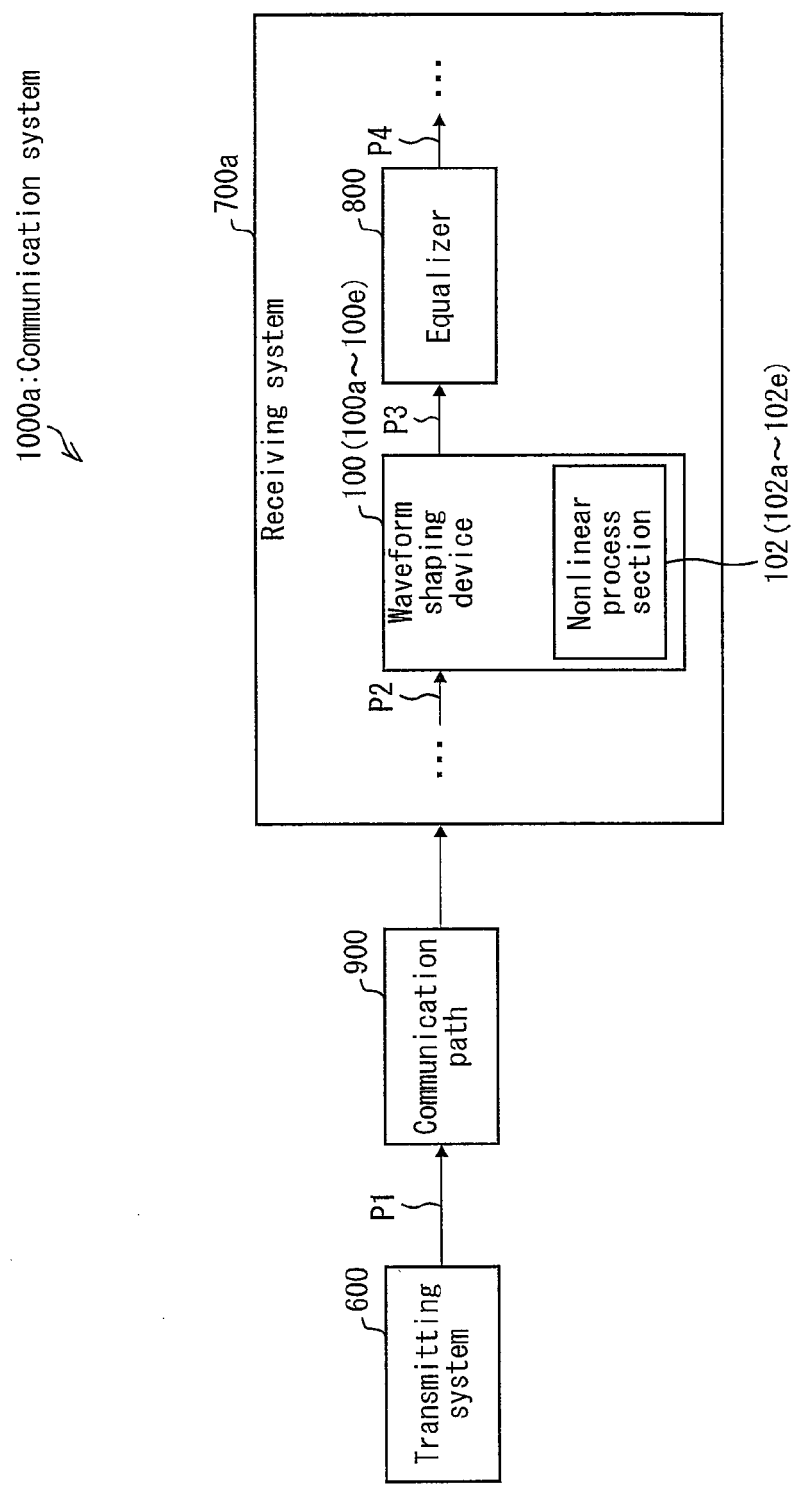
FIG. 1 is a block diagram showing a configuration of a communication system including a waveform shaping device of the present invention.
Figure 4:
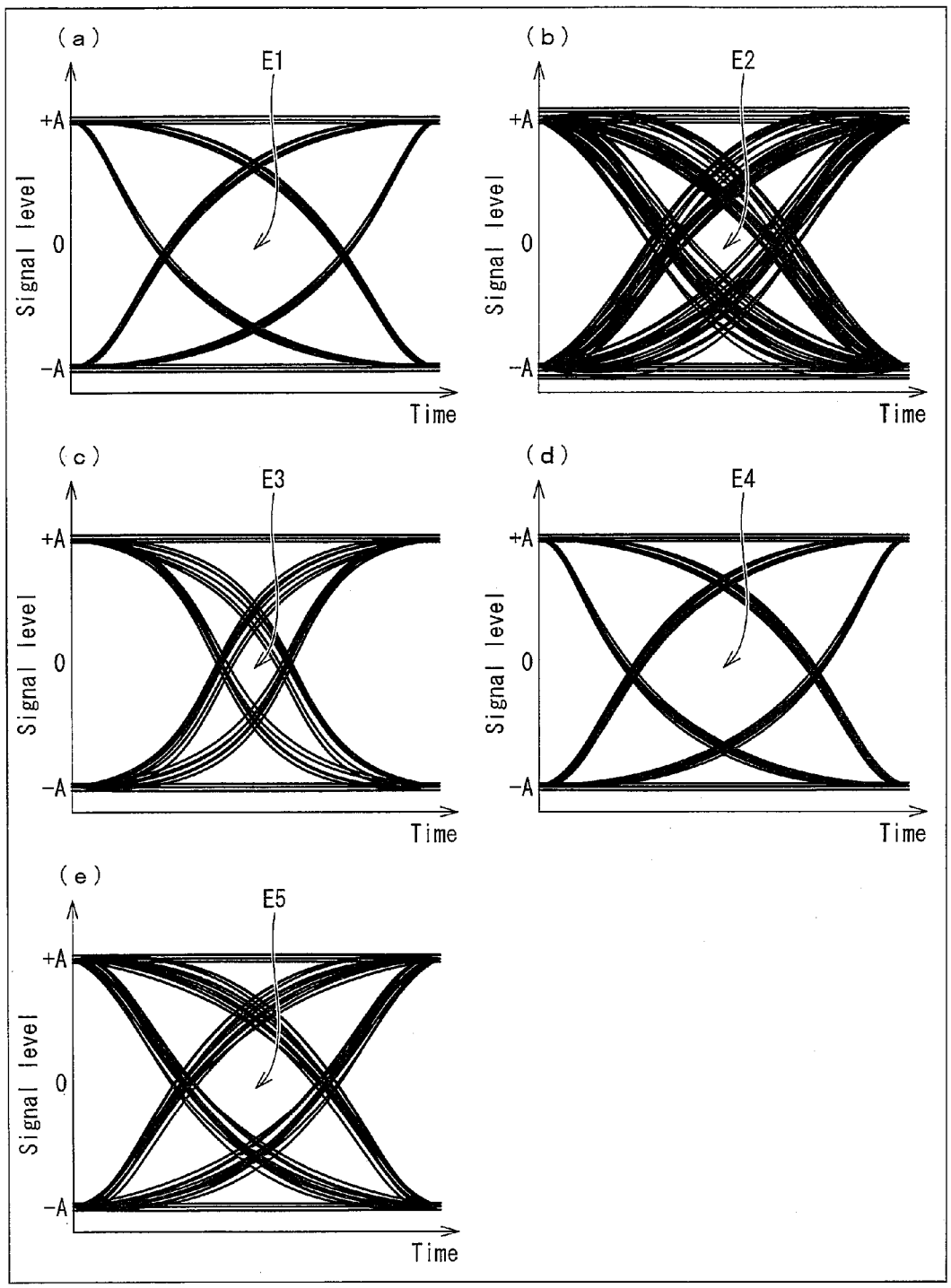

(a) of FIG. 4 schematically shows an eye pattern of a signal before being transmitted via a communication path, out of signals transmitted in the communication system shown in FIG. 1. (b) of FIG. 4 schematically shows an eye pattern of a signal having just passed through the communication path, out of the signals transmitted in the communication system shown in FIG. 1. (c) of FIG. 4 schematically shows an eye pattern of a signal outputted from the waveform shaping device, out of the signals transmitted in the communication system shown in FIG. 1. (d) of FIG. 4 schematically shows an eye pattern of a signal outputted from an equalizer, out of the signals transmitted in the communication system shown in FIG. 1. (e) of FIG. 4 schematically shows an eye pattern of a signal outputted from the equalizer in a case where the equalizer compensates waveform distortion of a signal having just passed through the communication path, out of the signals transmitted in the communication system shown in FIG. 1.

Figure 5:
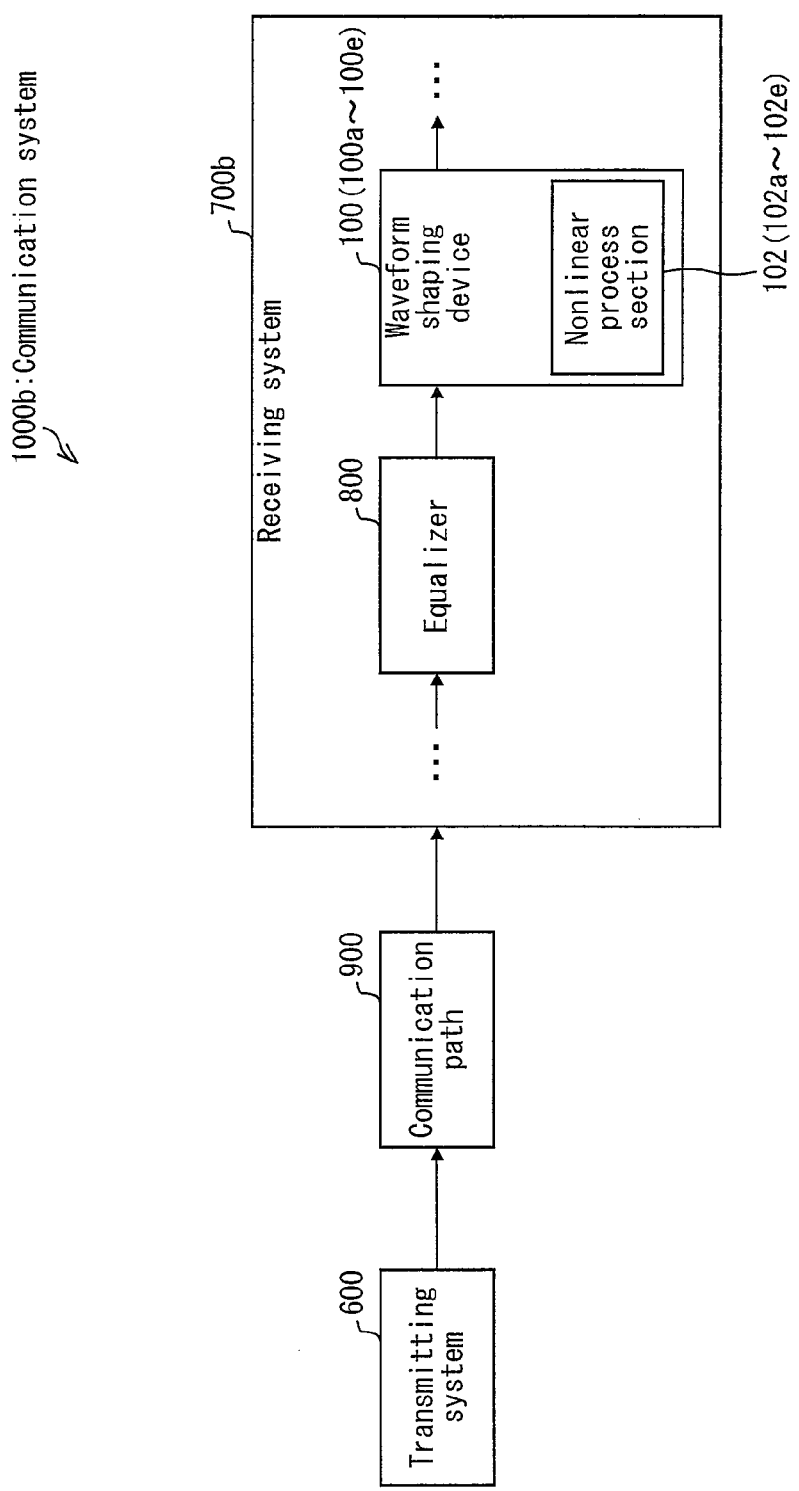

FIG. 5 is a block diagram showing another configuration of the communication system including the waveform shaping device of the present invention.

Figure 6:
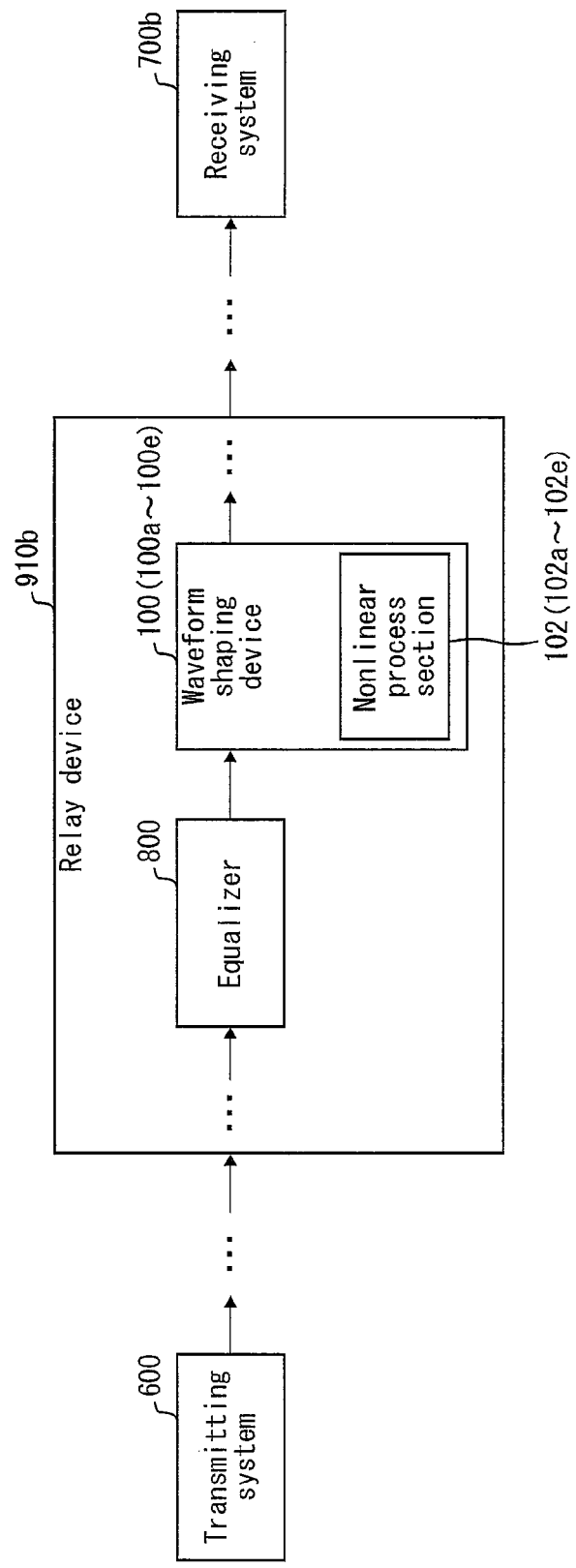

FIG. 6 is a block diagram showing another configuration of the relay device including the waveform shaping device of the present invention.

Figure 7:
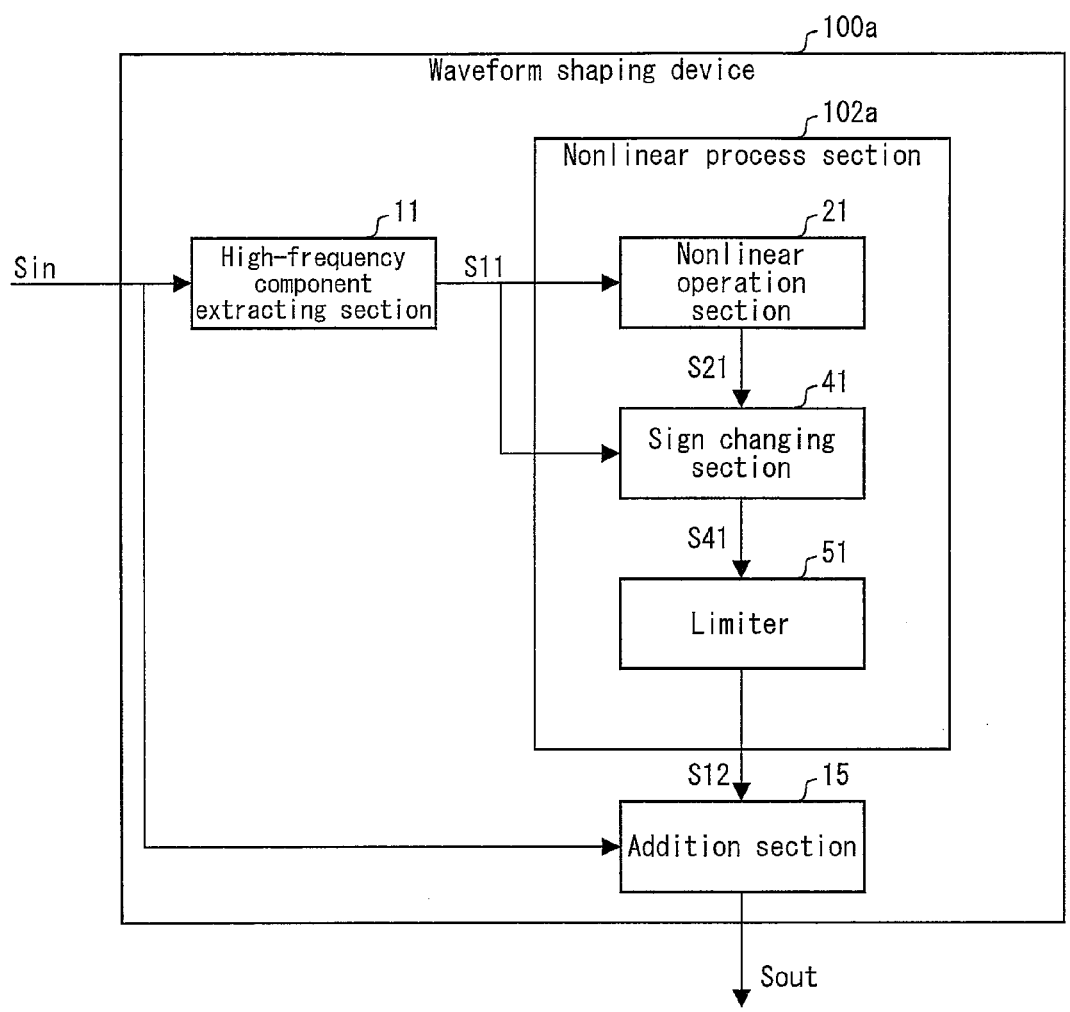

FIG. 7 is a block diagram showing a configuration of the waveform shaping device of the present invention.

Figure 8:
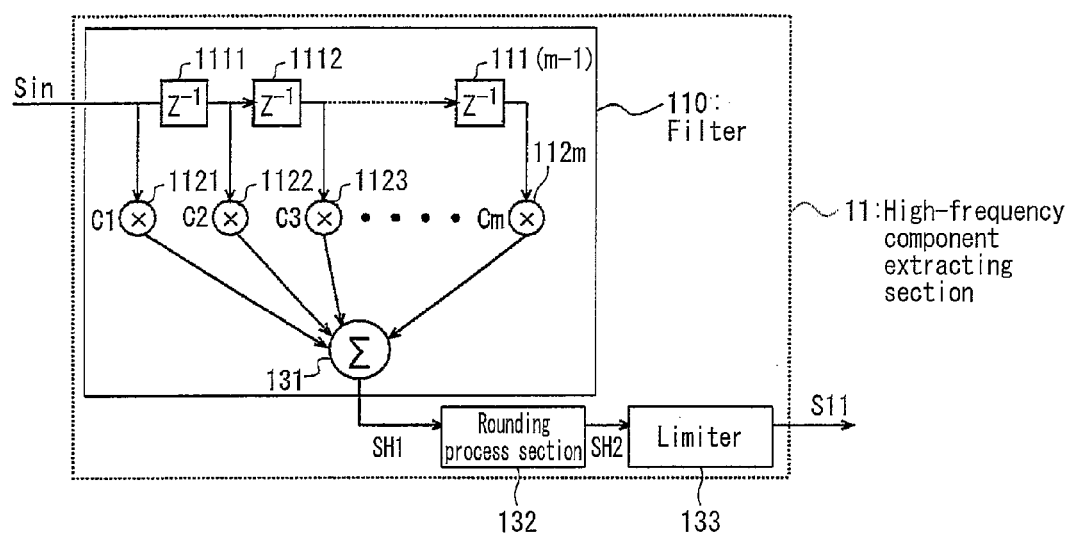

FIG. 8 is a block diagram showing a configuration of a high-frequency component extracting section included in the waveform shaping device shown in FIG. 7.

Figure 9:
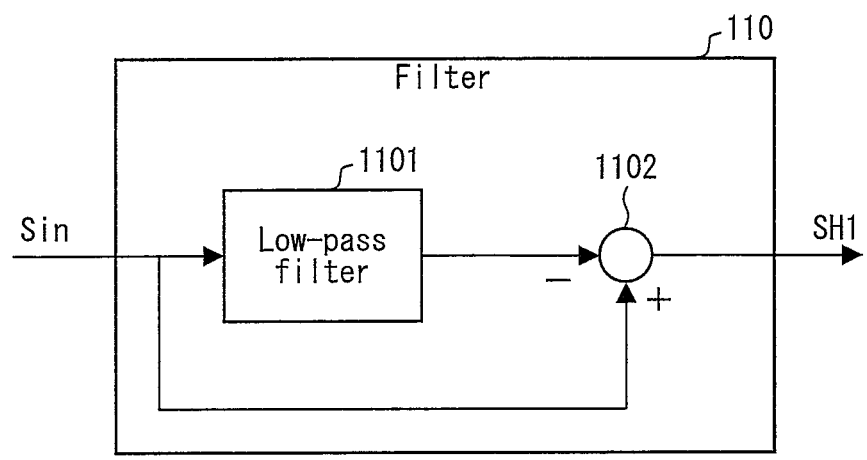

FIG. 9 is a block diagram showing another configuration example of a filter included in the high-frequency component extracting section shown in FIG. 8.

Figure 10:
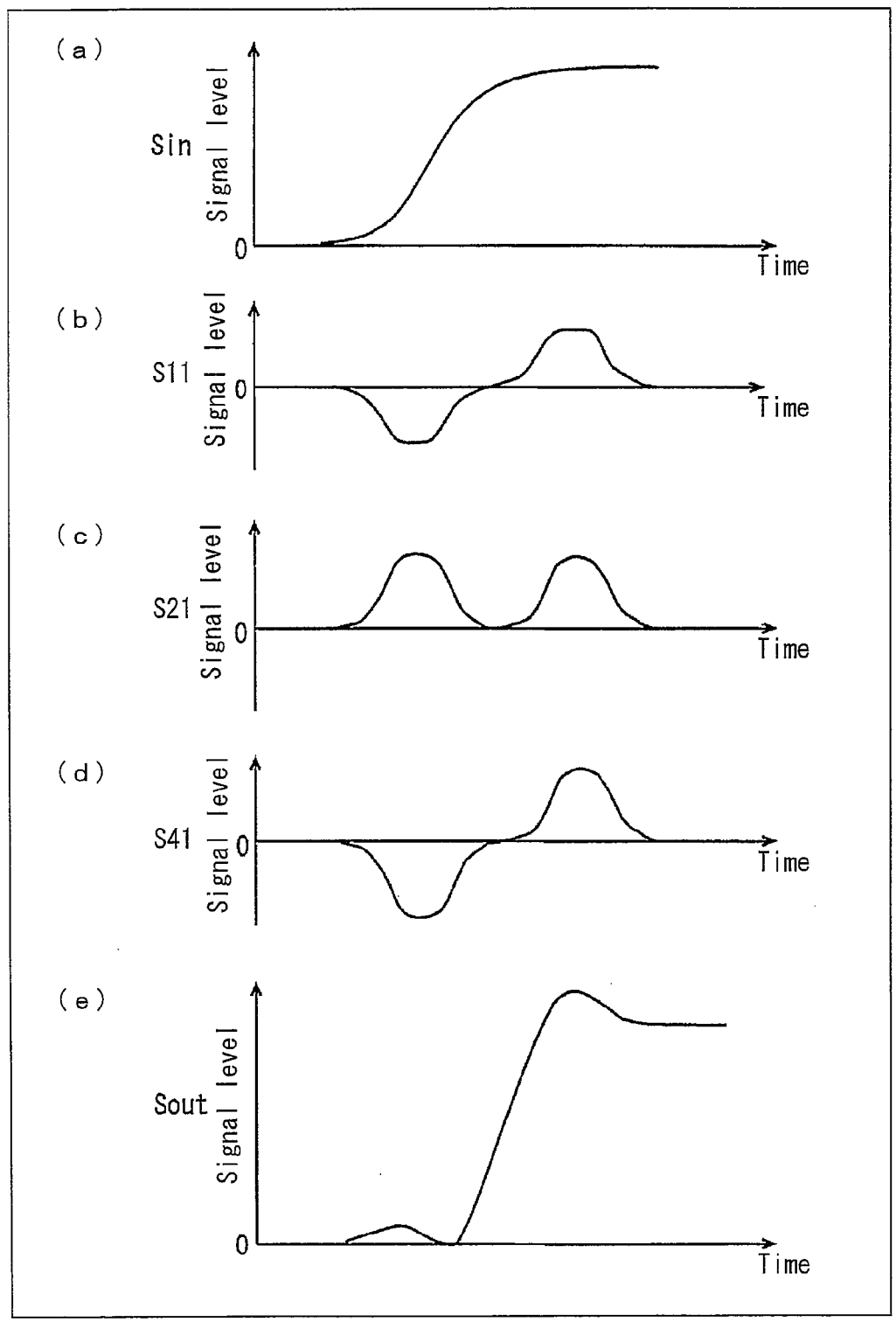

(a) of FIG. 10 schematically shows waveform of a signal inputted to the waveform shaping device shown in FIG. 7. (b) of FIG. 10 schematically shows waveform of a high-frequency signal generated by the waveform shaping device shown in FIG. 7. (c) of FIG. 10 schematically shows waveform of a nonlinear signal generated in the waveform shaping device shown in FIG. 7. (d) of FIG. 10 schematically shows waveform of a sign change signal generated in the waveform shaping device shown in FIG. 7. (e) of FIG. 10 schematically shows waveform of an output signal generated in the waveform shaping device shown in FIG. 7.

Figure 11:
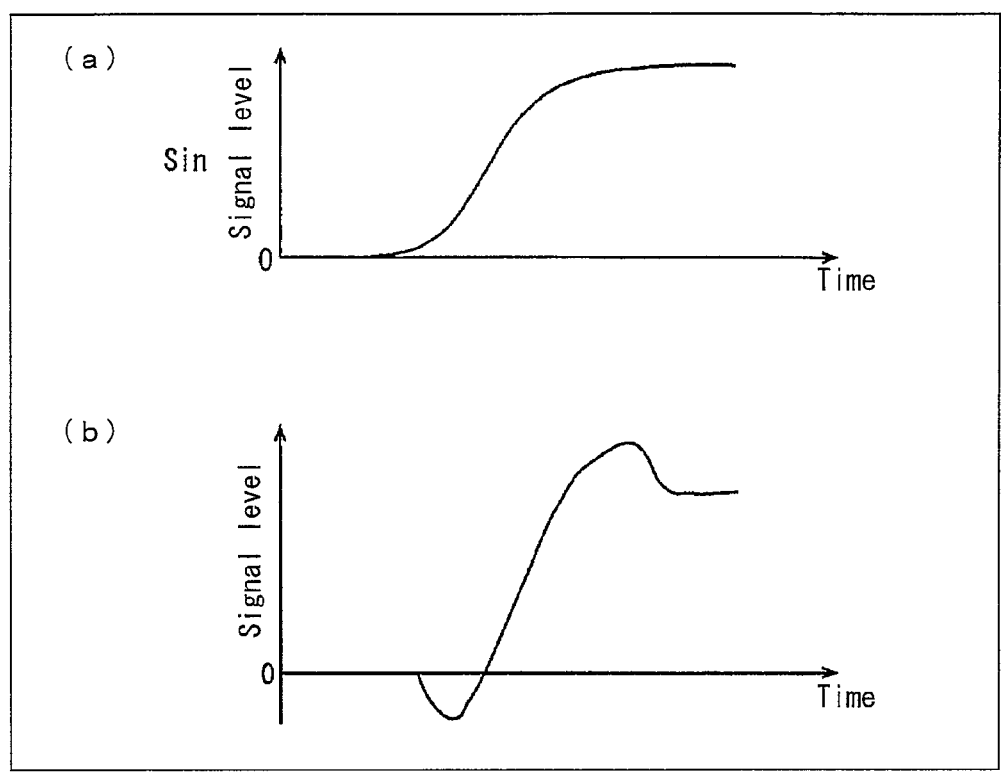

(a) of FIG. 11 is a drawing schematically showing waveform of a signal inputted to the waveform shaping device shown in FIG. 7. (b) of FIG. 11 is a drawing schematically showing waveform obtained by enhancing, according to the prior art, the waveform of the signal shown in (a) of FIG. 11.

Figure 12:
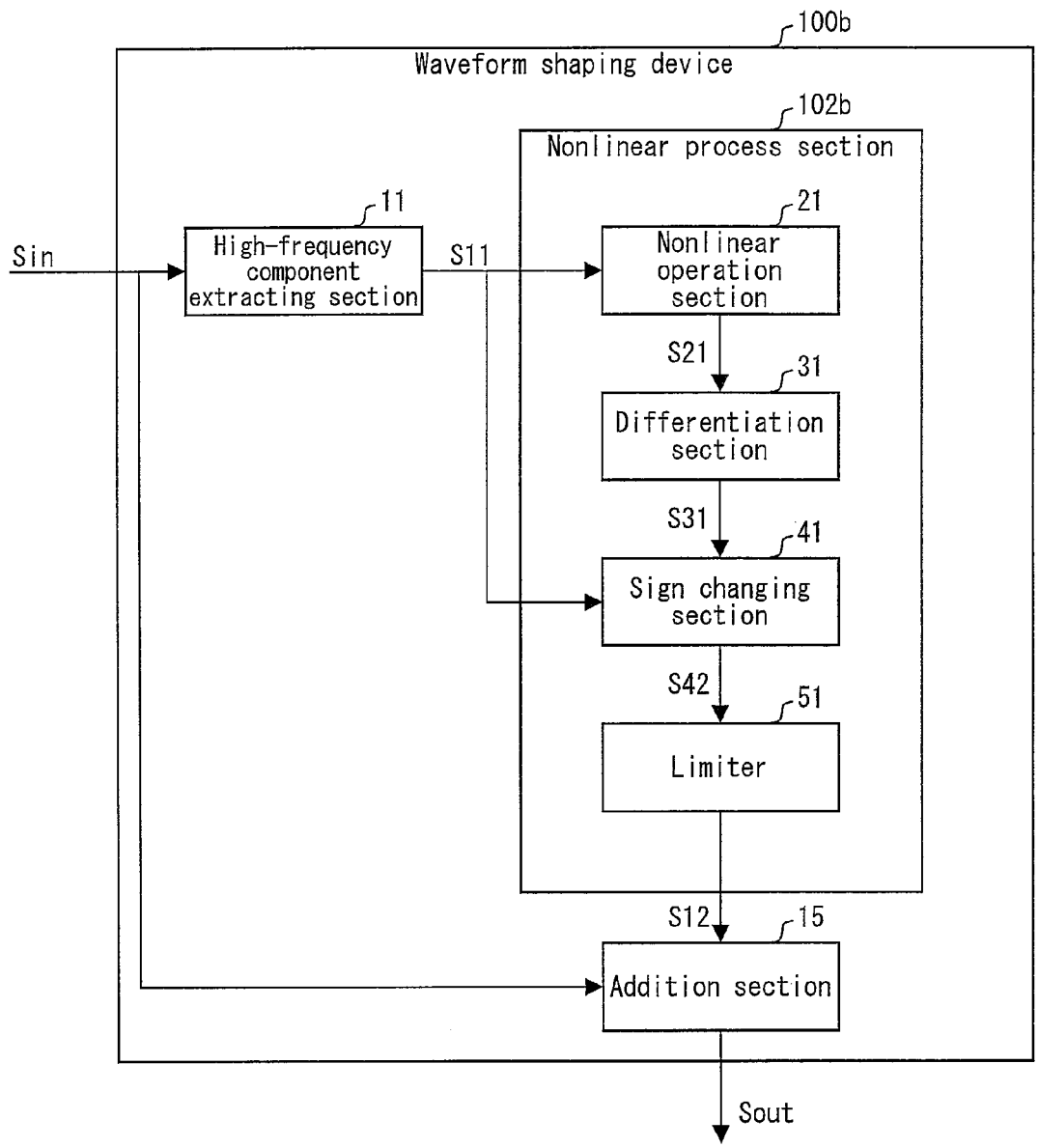

FIG. 12 is a block diagram showing another configuration of the waveform shaping device of the present invention.

Figure 13:
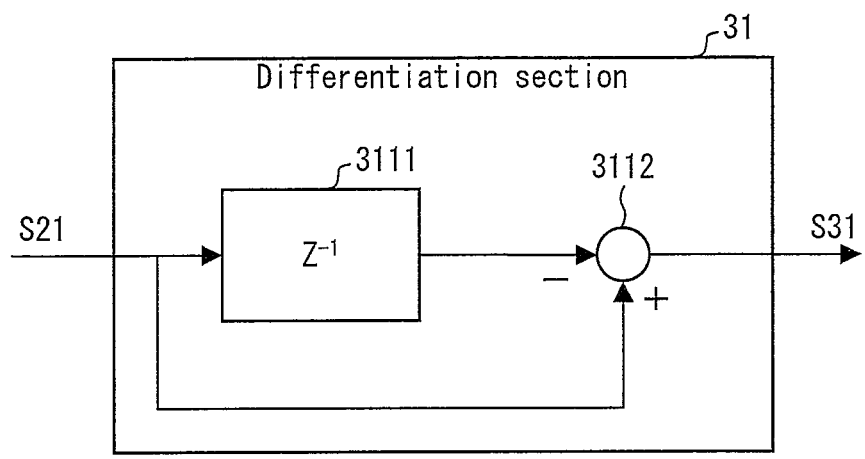

FIG. 13 is a block diagram showing a configuration of a differentiation section included in the waveform shaping device shown in FIG. 12.

Figure 14:
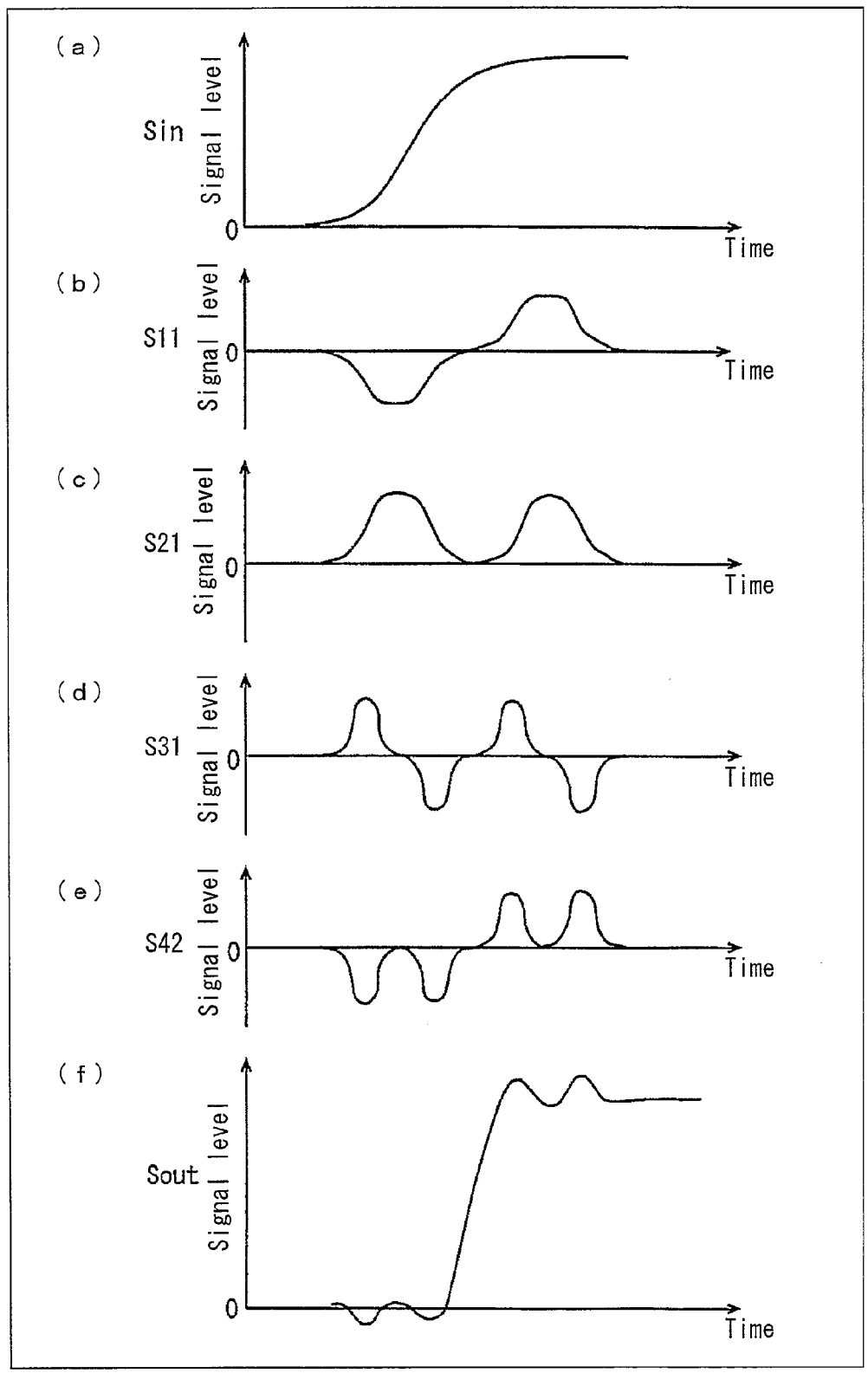

(a) of FIG. 14 schematically shows a waveform of a signal inputted to the waveform shaping device shown in FIG. 12. (b) of FIG. 14 schematically shows a waveform of a high-frequency signal generated in the waveform shaping device shown in FIG. 12. (c) of FIG. 14 schematically shows a waveform of a nonlinear signal generated in the waveform shaping device shown in FIG. 12. (d) of FIG. 14 schematically shows a waveform of a differentiation signal generated in the waveform shaping device shown in FIG. 12. (e) of FIG. 14 schematically shows a waveform of a sign change signal generated in the waveform shaping device shown in FIG. 12. (f) of FIG. 14 schematically shows a waveform of an output signal generated in the waveform shaping device shown in FIG. 12.

Figure 15:
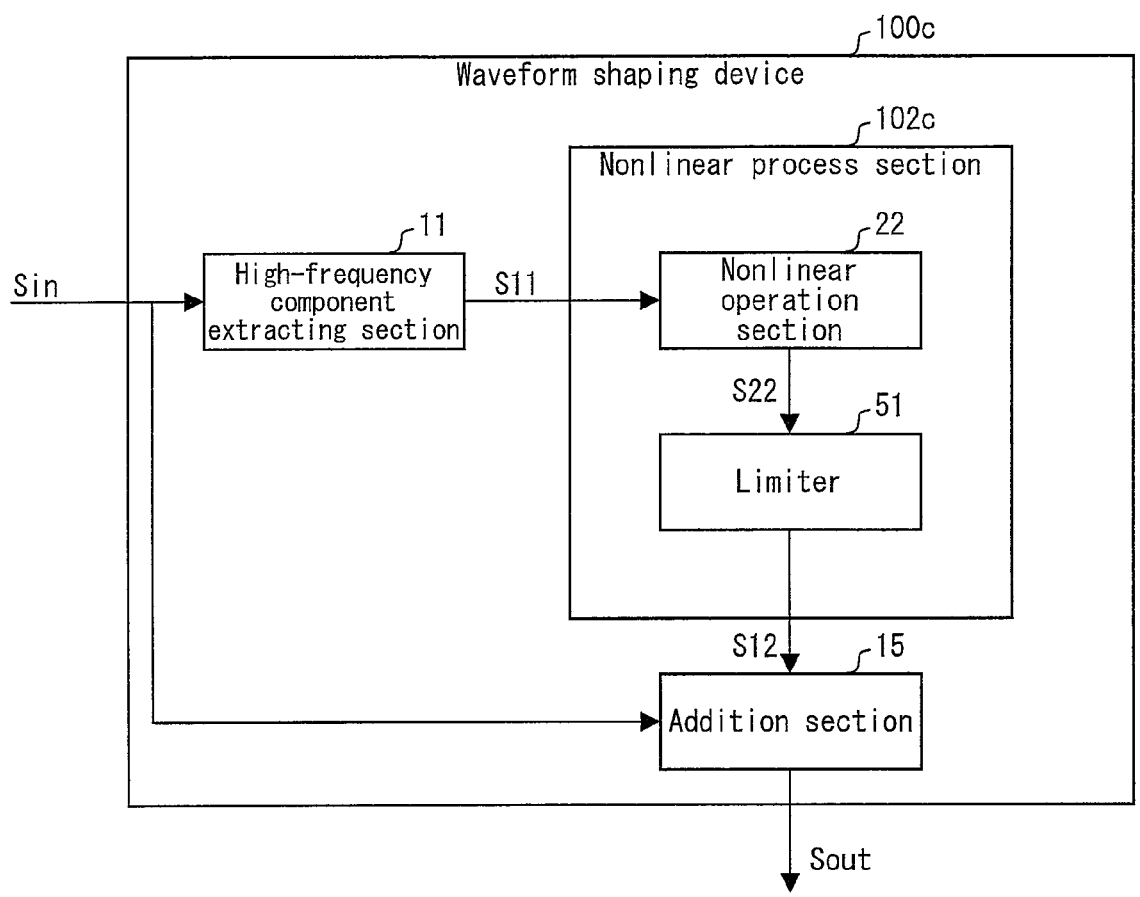

FIG. 15 is a block diagram showing still another configuration of the waveform shaping device of the present invention.

Figure 16:
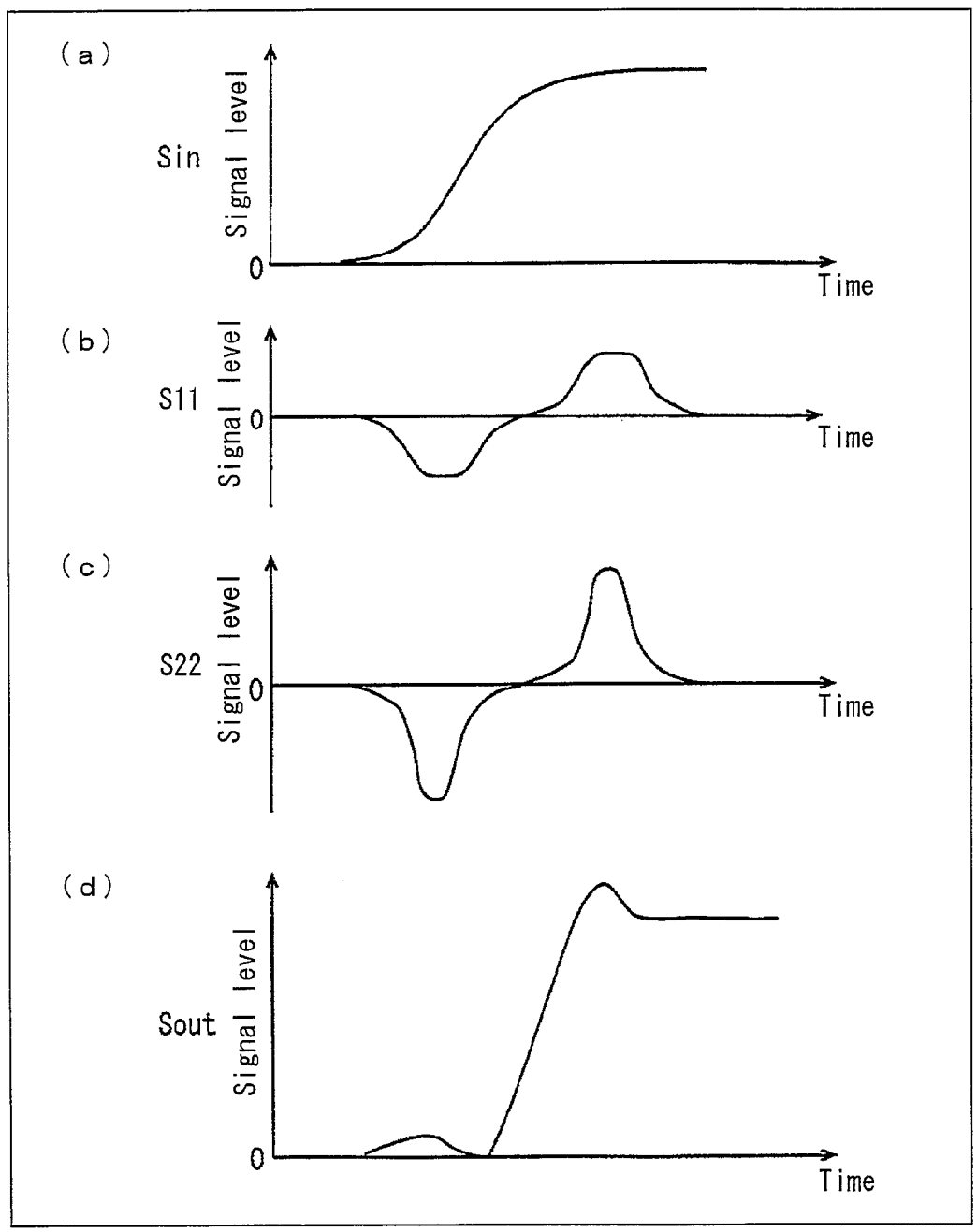

(a) of FIG. 16 schematically shows a waveform of a signal inputted to the waveform shaping device shown in FIG. 15. (b) of FIG. 16 schematically shows a waveform of a high-frequency signal generated in the waveform shaping device shown in FIG. 15. (c) of FIG. 16 schematically shows a waveform of a nonlinear signal generated in the waveform shaping device shown in FIG. 15. (d) of FIG. 16 schematically shows a waveform of an output signal generated in the waveform shaping device shown in FIG. 15.

Figure 17:
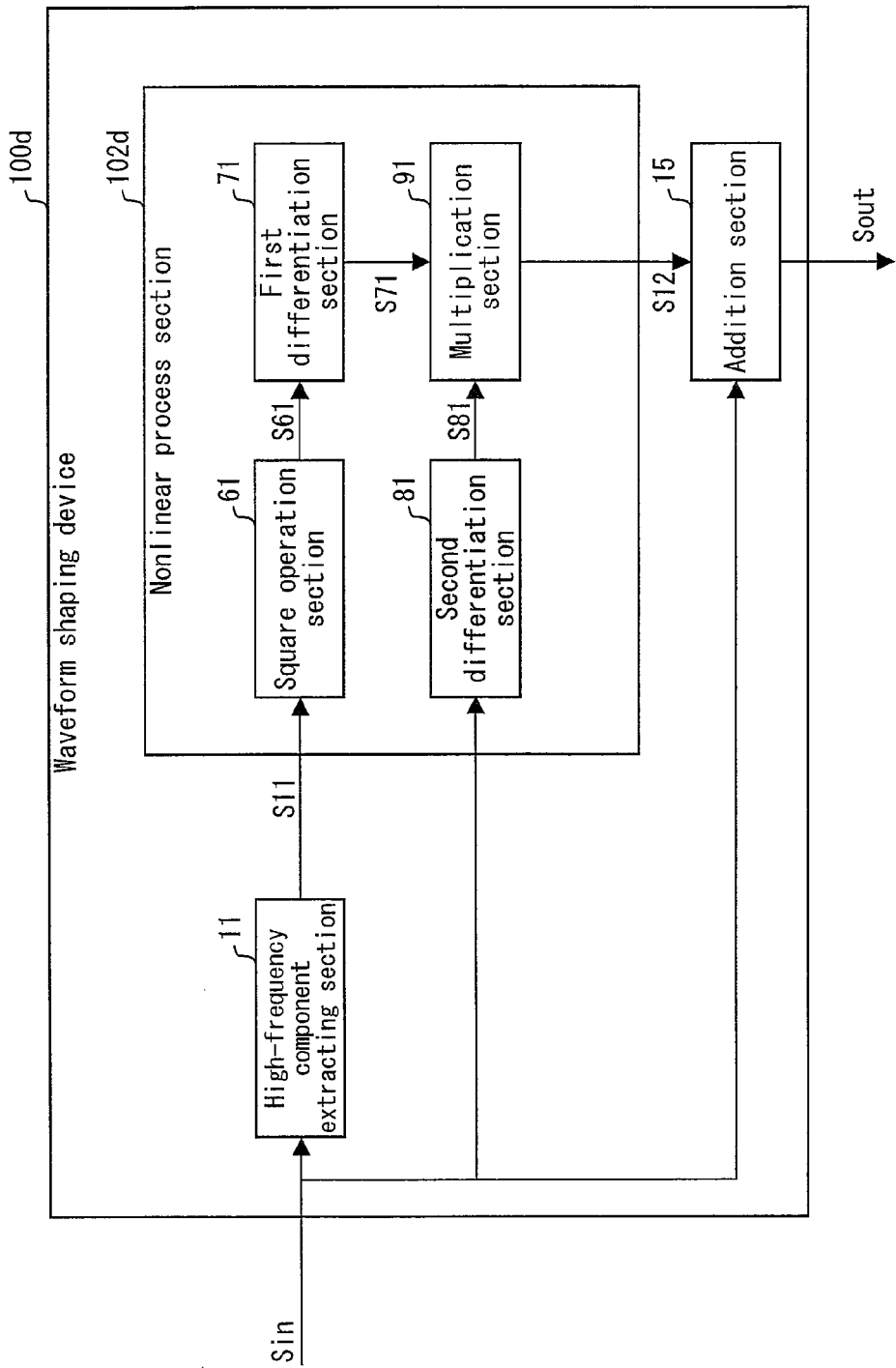

FIG. 17 is a block diagram showing still another configuration of the waveform shaping device of the present invention.

Figure 18:
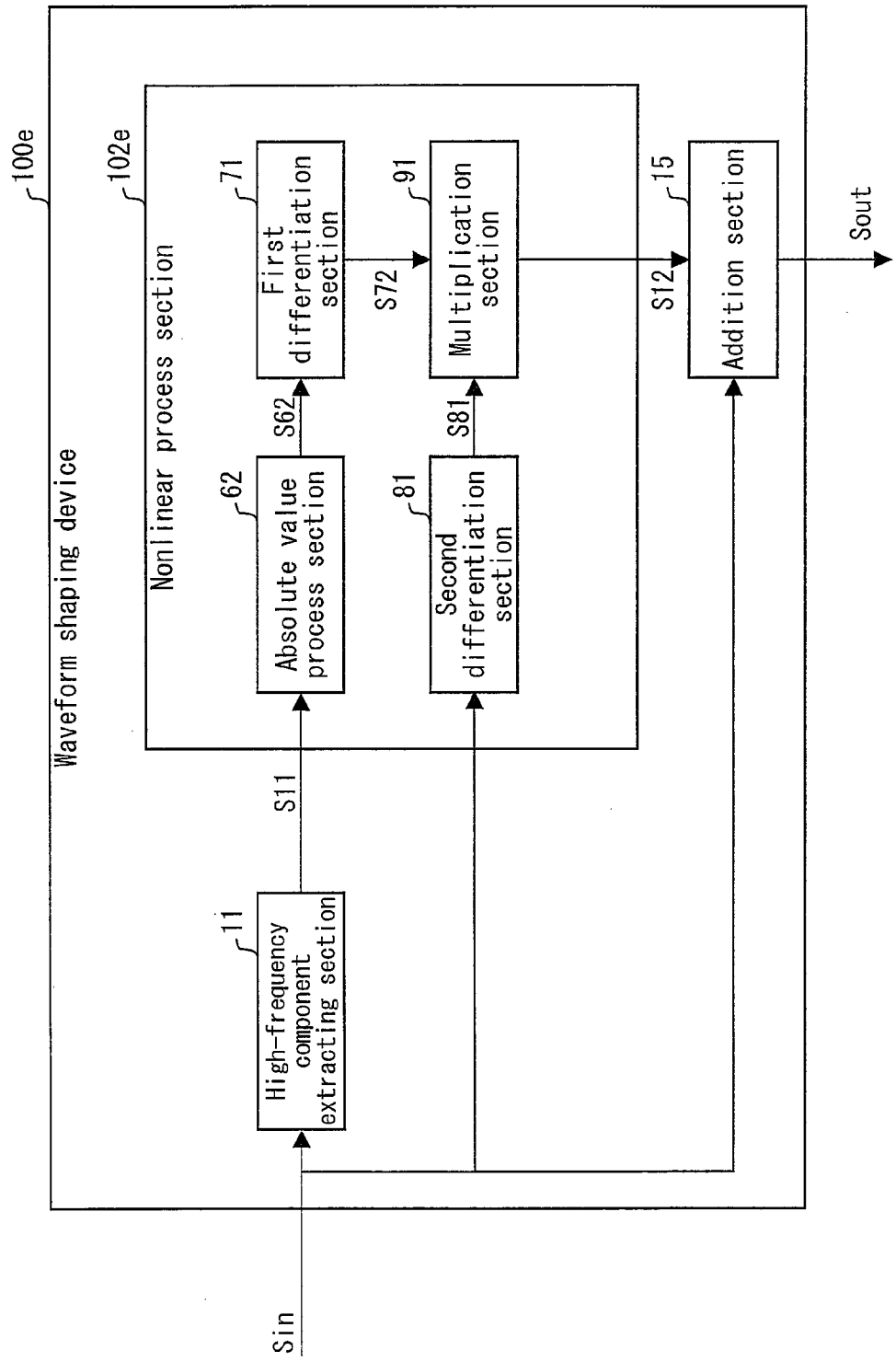

FIG. 18 is a block diagram showing still another configuration of the waveform shaping device of the present invention.

Figure 19:
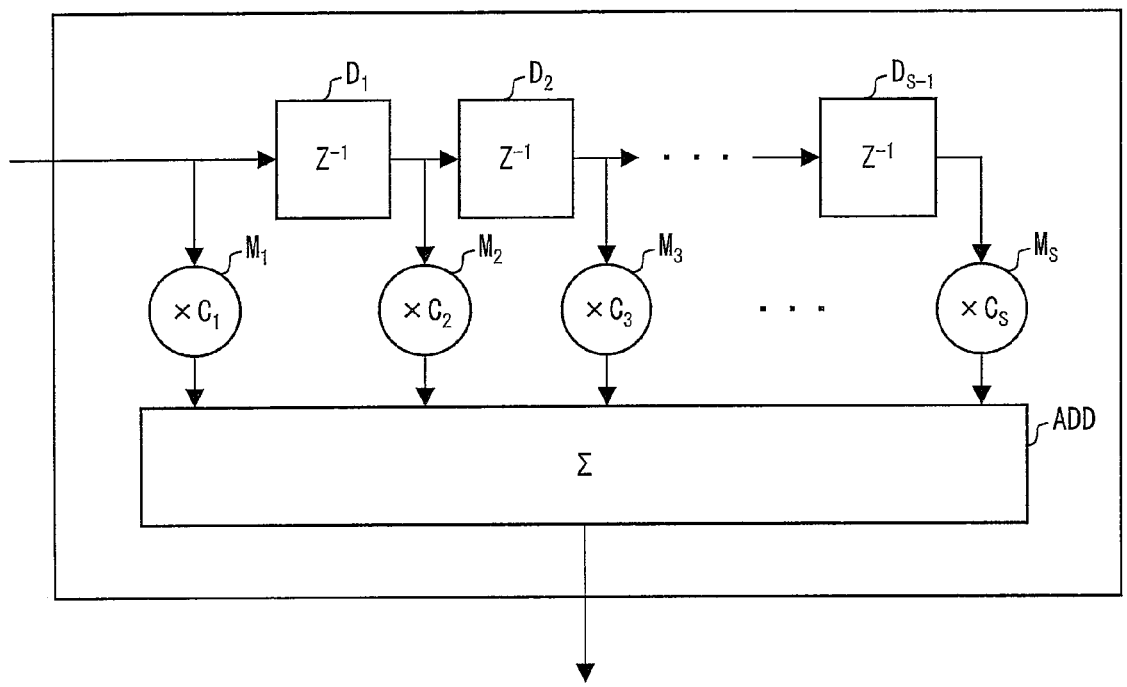

FIG. 19 is a block diagram showing a configuration of a transversal linear filter included in a conventional equalizer.

DESCRIPTION OF EMBODIMENTS

The following explains an embodiment of the present invention with reference to FIGS. 1 to 18.

1. Outline of Waveform Shaping Device

A waveform shaping device 100 in accordance with the present embodiment is a device for subjecting an externally input signal to a sharpening process for sharpening the waveform of the input signal and outputting the sharpened signal. The sharpening process indicates a process for making rising and falling of an input signal steep (i.e. enhancing rising and falling of an input signal).

Hereinafter, a signal input to the waveform shaping device 100 is referred to as an input signal Sin. A signal output from the waveform shaping device 100 is referred to as an output signal Sout.

As mentioned later, the waveform shaping device 100 can subject a high-frequency component of the input signal Sin to nonlinear operation so that a high-frequency component which is not included in the input signal Sin (specifically, frequency component whose frequencies are higher than the Nyquist frequency which is half the sampling frequency when the input signal Sin is made discrete) is included in the output signal Sout. Consequently, the sharpening process carried out by the waveform shaping device 100 enables rising and falling of an input signal to be steeper than the case of a sharpening process based on linear operation.

The configuration of the waveform shaping device 100 will be detailed later.

2. Communication System Including Waveform Shaping Device

The following explains a configuration example of a communication system including the waveform shaping device 100, an effect yielded by inclusion of the waveform shaping device 100 etc., with reference to FIGS. 1 to 6.

In a case where waveform shaping devices 100a to 100e which will be mentioned later are not distinguished from each other, they are merely referred to as "waveform shaping device 100". Further, in a case where nonlinear process sections 102a to 102e which will be mentioned later are not distinguished from each other, they are merely referred to as "nonlinear process section 102".

Further, in a case where receiving systems 700a and 700b which will be mentioned later are not distinguished from each other, they are merely referred to as "receiving system 700". Further, in a case where relay devices 910a and 910b which will be mentioned later are not distinguished from each other, they are merely referred to as "relay device 910".

2-1. Configuration Example 1 of Communication System

FIG. 1 is a block diagram showing a configuration of a communication system 1000a including the waveform shaping device 100. As shown in FIG. 1, the communication system 1000a includes at least a transmitting system 600 and a receiving system 700a, and the transmitting system 600 and the receiving system 700a are communicably connected with each other via a communication path 900.

The transmitting system 600 transmits a signal indicative of various data such as video images and audios via the communication path 900 to the receiving system 700a, and includes functions normally provided at the transmission end, such as coding and modulation of signals etc. A signal transmitted from the transmitting system 600 is overlapped with a clock signal.

The receiving system 700a receives a signal from the transmitting system 600 via the communication path 900, and includes functions normally provided at the reception end, such as demodulation and decoding of signals, and so-called 3R functions (reshaping, retiming, and regenerating) etc.

Further, as shown in FIG. 1, the receiving system 700a includes the waveform shaping device 100 and an equalizer (external distortion compensating means) 800 in particular. The waveform shaping device 100 is positioned at a stage prior to the equalizer 800 so that the output signal Sout from the waveform shaping device 100 is inputted to the equalizer 800. The wavelength shaping device 100 includes at least a nonlinear process section (nonlinear process means) 102.

The equalizer 800 carries out at least a process for extracting a clock signal from a signal transmitted from the transmitting system 600 and reproducing the clock signal (hereinafter referred to as a clock reproduction process) and a process for compensating waveform distortion of a signal caused by transmission properties of the communication path 900 (hereinafter referred to as a distortion compensation process). The waveform shaping device 100 operates in accordance with the clock reproduced by the equalizer 800.

Figure 2:
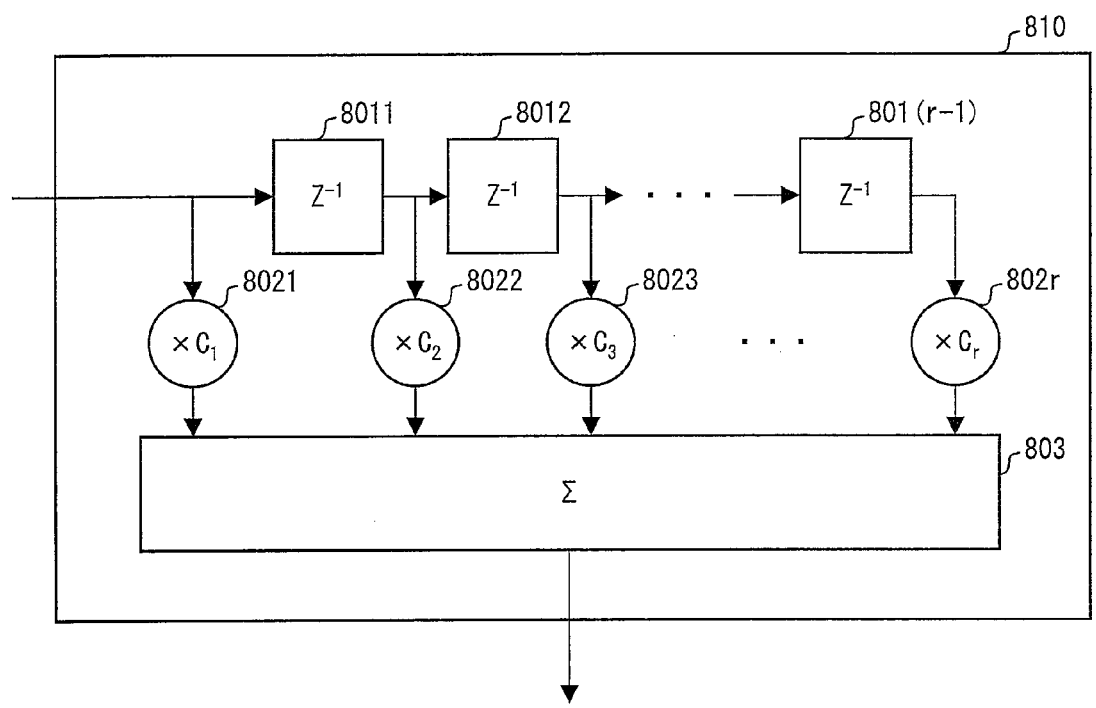
FIG. 2 is a block diagram showing a configuration example of a transversal linear filter included in an equalizer in the communication system shown in FIG. 1.

It is supposed that the distortion compensation process carried out by the equalizer 800 is carried out by a transversal linear filter 810 having the configuration shown in FIG. 2. FIG. 2 is a block diagram showing a configuration example of the transversal linear filter 810 included in the equalizer 800. In this example, the linear filter 810 is a liner filter including r taps (r is a positive integer of 3 or greater). That is, the linear filter 810 includes r−1 unit delay elements 801$q$ (q=1, 2, . . . , and r−1), r multiplication sections 802$p$ (p=1, 2, . . . , and r), and an addition section 803. Cp (p=1, 2, . . . , and r) is a coefficient to be multiplied by the multiplication section Mu.

When the transmitting system 600 and the receiving system 700$a$ communicate with each other at a long distance, they normally communicate with each other via one or a plurality of relay devices such as switches and switching equipment. In this case, it is desirable that the relay device carries out the distortion compensation process on a signal which the relay device has received. This is because the distortion compensation process in the middle of communication will reduce waveform distortion of a signal received by the receiving system 700$a$. Accordingly, the relay device may be arranged to include the waveform shaping device 100 and the equalizer 800.

Figure 3:
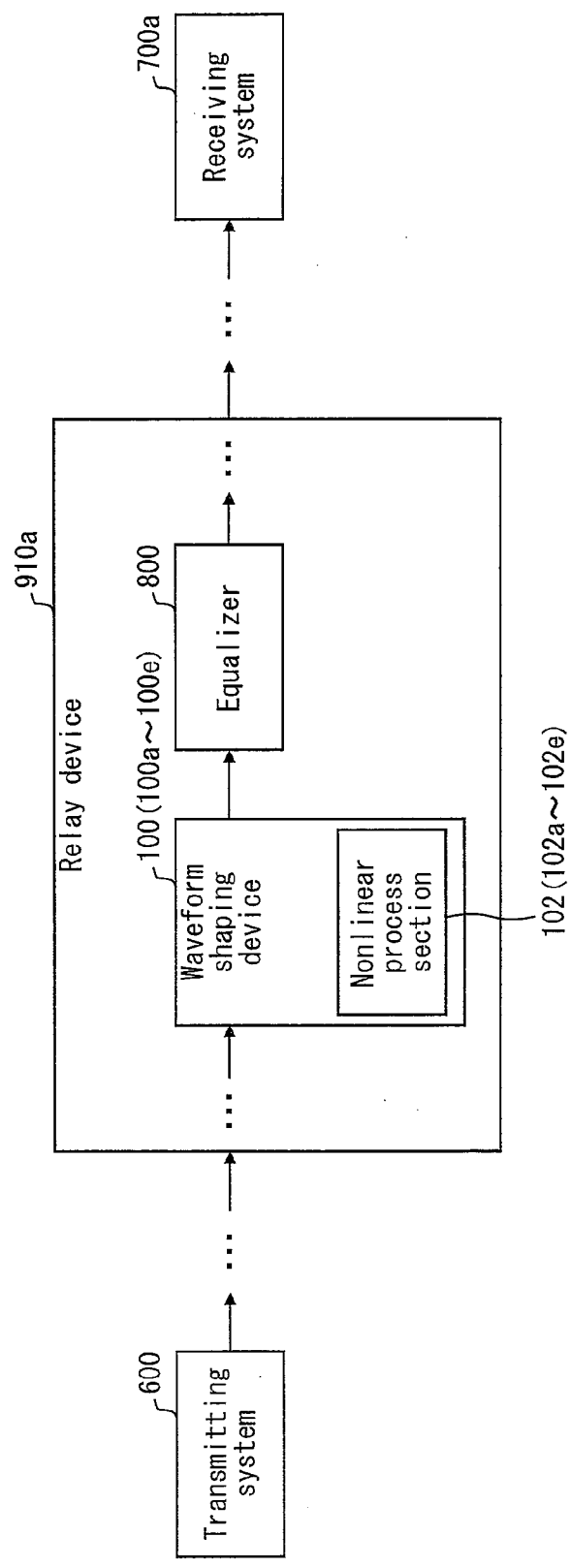
FIG. 3 is a block diagram showing a configuration of a relay device including the waveform shaping device of the present invention.

FIG. 3 is a block diagram showing a configuration of a relay device 910$a$. The relay device 910$a$ is a switch, switching equipment etc. which relays a signal transmitted from the transmitting system 600 to the receiving system 700$a$, and includes functions normally provided in relay devices. Further, as shown in FIG. 3, the relay device 910$a$ includes the waveform shaping device 100 and the equalizer 800 in particular. The waveform shaping device 100 is positioned at a stage prior to the equalizer 800 so that the output signal Sout from the waveform shaping device 100 is inputted to the equalizer 800.

2-2. Effect Yielded by Positioning Waveform Shaping Device at a Stage Prior to Equalizer As explained in the Background Art, in order that an equalizer including a transversal linear filter (hereinafter transversal equalizer) has higher ability to compensate waveform distortion, the number of taps (the number of multiplication sections in the linear filter) is required to be increased (e.g. taps in the order of hundreds). Consequently, in general, the transversal equalizer has large circuits and require high costs.

In contrast thereto, the receiving system 700$a$ and the relay device 910$a$ are designed such that the waveform shaping device 100 is positioned at a stage prior to the equalizer 800. Consequently, initially, the sharpening process carried out by the waveform shaping device 100 makes rising and falling of a received signal steep. Accordingly, even when a rising part of a clock signal included in a signal received by the receiving system 700$a$ and the relay device 910$a$ is difficult to be identified, the sharpening process carried out by the waveform shaping device 100 makes rising of a transmission signal steep. In signal transmission, it is general that transmission information and a clock are transmitted together. The equalizer 800 reproduces a clock from a transmission signal and latches the transmission signal in accordance with the reproduced clock. Accordingly, when the transmission signal rises sharply, the equalizer 800 can reproduce an accurate clock having rising and falling with accurate timing. In a case of a mildly rising signal, there is a possibility that the timing of rising cannot be obtained accurately, and consequently jitters appear in the reproduced clock.

Here, it is assumed that variations in a clock signal included in a received signal are few, and mismatch in timing to reproduce a clock in the equalizer 800 is extremely small. That is, jitters generated in the communication path 900 are small.

When a clock can be reproduced accurately, the equalizer 800 can sufficiently compensate waveform distortion with a small number of taps. That is, when a clock can be reproduced accurately, the number of taps in the equalizer 800 (the number of the multiplication sections 802$p$) is not required to be as large as the number of taps required for a transversal equalizer alone to sufficiently compensate waveform distortion.

Therefore, by positioning the waveform shaping device 100 at a stage prior to the equalizer 800, it is possible to downsize the equalizer 800 and make the equalizer 800 less expensive, and to reduce the process load on the equalizer 800.

Further, even in a case where distortion which is so large that a normal transversal equalizer alone cannot sufficiently compensate is caused due to phase distortion, phasing etc., the waveform shaping device 100 in the receiving system 700$a$ and the relay device 910$a$ causes a signal to rise and fall sharply beforehand as described above, so that the equalizer 800 can reproduce a clock. Consequently, it is possible to compensate waveform distortion.

Further, by positioning the waveform shaping device 100 at a stage prior to the equalizer 800, the relay device 910$a$ can sufficiently compensate waveform distortion as described above. Consequently, the number of the relay device 910$a$ on the communication path 900 can be smaller than the number of relay devices having no waveform shaping device 100 on the communication path 900. That is, it is possible to reduce the number of relay devices on the communication path 900. This allows reducing costs for providing and maintaining relay devices.

2-3. Eye Pattern

The following explains waveform of a signal transmitted in the communication system 1000$a$ with reference to FIG. 4. (a) of FIG. 4 to (d) of FIG. 4 schematically show so-called eye patterns (eye diagrams) (diagram in which plural waveforms of signals are overlapped) of signals transmitted in the communication system 1000$a$.

Initially, (a) of FIG. 4 schematically shows an eye pattern of a signal transmitted by the transmitting system 600 before passing through the commutation path 900. That is, (a) of FIG. 4 schematically shows an eye pattern of a signal passing through a position P1 shown in FIG. 1. The signal passing through the position P1 does not have waveform distortion because the signal has not yet passed the communication path 900. Consequently, a region E1 of the eye opening of the eye pattern shown in (a) of FIG. 4 has a large area (that is, so-called eye-opening ratio is high).

Next, (b) of FIG. 4 schematically shows an eye pattern of a signal having just passed through the communication path 900. That is, (b) of FIG. 4 schematically shows an eye pattern of a signal passing through a position P2 shown in FIG. 1. The signal having passed through the communication path 900 has waveform distortion according to transmission properties. Consequently, a region E2 of the eye opening of an eye pattern shown in (b) of FIG. 4 has a smaller area than the region E1 (i.e. has a smaller eye-opening ratio).

Next, (c) of FIG. 4 schematically shows an eye pattern of a signal outputted from the waveform shaping device 100. That is, (c) of FIG. 4 schematically shows an eye pattern of a signal passing through the position P3 shown in FIG. 1. As described above, the input signal Sin inputted to the waveform shaping device 100 is made to rise and fall sharply by the sharpening process carried out by the waveform shaping device 100 and is outputted as an output signal Sout. Consequently, a region E3 of the eye opening of an eye pattern shown in (c) of FIG. 4 is longer in a longitudinal direction than the region E2.

Lastly, (d) of FIG. 4 schematically shows an eye pattern of a signal outputted from the equalizer 800. That is, (d) of FIG. 4 schematically shows an eye pattern of a signal passing through a position P4 shown in FIG. 1. The equalizer 800 compensates waveform distortion of a signal. Consequently, a region E4 of the eye opening of an eye pattern shown in (d) of FIG. 4 is substantially equal to the region E1.

For comparison, with reference to (e) of FIG. 4, an eye pattern of a signal whose waveform distortion is compensated by the equalizer 800 only without being subjected to the sharpening process by the waveform shaping device 100 is presented as an example. (e) of FIG. 4 schematically shows an eye pattern of a signal outputted from the equalizer 800 in a case where the equalizer 800 compensates waveform distortion of a signal passing through the position P2 right after passing through the communication path 900.

A region E5 of the eye opening of an eye pattern shown in (e) of FIG. 4 has a wider area than the region E2, but not so wide as the region E4 of the eye opening of the eye pattern shown in (d) of FIG. 4. From this result, it is found that compensating waveform distortion of a signal by the equalizer 800 after subjecting the signal to the sharpening process by the waveform shaping device 100 allows more effective compensation than compensating waveform distortion of a signal by the equalizer 800 only.

2-4. Modification Example of Configuration Example 1

In the above explanations, the receiving system 700a and the relay device 910a are designed such that the waveform shaping device 100 and the equalizer 800 are adjacent to each other. However, the waveform shaping device 100 and the equalizer 800 are not necessarily adjacent to each other. That is, other device (apparatus) may be provided between the waveform shaping device 100 and the equalizer 800, and the output signal Sout from the waveform shaping device 100 may be inputted to the equalizer 800 via the other device. This configuration yields an effect similar to the above effect.

Examples of the other device (apparatus) provided between the waveform shaping device 100 and the equalizer 800 include a signal distributor for distributing a signal to a plurality of devices, and a phase rotator for regulating a phase when there is a fixed phase shift.

In the above explanations, the receiving system 700a and the relay device 910a are designed to include both of the waveform shaping device 100 and the equalizer 800. Alternatively, the receiving system 700a and the relay device 910a may include a device in which the function of the waveform shaping device 100 and the function of the equalizer 800 are integrated with each other. For example, a signal may be subjected to the sharpening process in an equalizer in which the function of the waveform shaping device 100 (waveform shaping function) and the function of the equalizer 800 (clock reproducing function, waveform compensating function) are integrated with each other, before being subjected to a distortion compensating process. This case yields an effect similar to the above effect.

2-5. Case for Which Configuration Example 1 is Suitable

In a case where a rising part of a received signal is easy to identify, it is easy for the equalizer 800 to extract a clock signal. In this case, it is unnecessary for the waveform shaping device 100 to carry out the sharpening process at a stage prior to the equalizer 800. On the other hand, in a case where a rising part of a received signal is difficult to identify, it is difficult for the equalizer 800 to extract a clock signal. In this case, it is desirable for the waveform shaping device 100 to carry out the sharpening process at a stage prior to the equalizer 800 so that a signal rises sharply. That is, the configuration of the communication system 1000a in which the waveform shaping device 100 is positioned at a stage prior to the equalizer 800 is suitable for a case where a rising part of a received signal is difficult to identify.

Further, in a case where jitters occurring in the communication path 900 are large, subjecting a signal to the sharpening process by the waveform shaping device 100 at a stage prior to the equalizer 800 causes the signal swaying due to the jitters to rise and fall sharply, resulting in a possibility that the equalizer 800 mistakenly extracts a clock signal. For this reason, in this case, it is preferable not to subject a signal to the sharpening process by the waveform shaping device 100 at a stage prior to the equalizer 800. In other words, the configuration of the communication system 1000a in which the waveform shaping device 100 is positioned at a stage prior to the equalizer 800 is suitable for a case where jitters occurring in the transmitting path 900 are small.

2-6. Configuration Example 2 of Communication System

The receiving system 700a and the relay device 910a shown in FIG. 1 are designed such that the waveform shaping device 100 is positioned at a stage prior to the equalizer 800 and the output signal Sout from the waveform shaping device 100 is inputted to the equalizer 800.

Alternatively, the waveform shaping device 100 may be positioned at a stage posterior to the equalizer 800.

With reference to FIG. 5, the following explains a configuration of a communication system 1000b including the waveform shaping device 100. FIG. 5 is a block diagram showing the configuration of the communication system 1000b including the waveform shaping device 100. As shown in FIG. 5, the communication system 1000b includes a receiving system 700b instead of the receiving system 700a of the communication system 1000b.

Similarly with the receiving system 700a, the receiving system 700b receives a signal from the transmitting system 600 via the communication path 900, and has functions normally provided at the receiving end, such as modulation of a signal, decoding of a signal, 3R functions etc.

As shown in FIG. 5, the receiving system 700b includes an equalizer 800 and a waveform shaping device 100 at a stage posterior to the equalizer 800, and is designed such that a signal from the equalizer 800 is inputted as an input signal Sin to the waveform shaping device 100.

It is preferable that one or a plurality of relay devices such as switches and switching equipment which relays a signal transmitted between the transmitting system 600 and the receiving system 700b also compensate waveform distortion of a signal arriving at the relay device as described above.

FIG. 6 is a block diagram showing a configuration of the relay device 910b. The relay device 910b relays a signal transmitted from the transmitting system 600 to the receiving system 700b, and has functions normally provided in relay devices. As shown in FIG. 6, the relay device 910b includes, in particular, an equalizer 800 and a waveform shaping device 100 at a stage posterior to the equalizer 800, and is designed such that a signal from the equalizer 800 is inputted as an input signal Sin to the waveform shaping device 100.

2-7. Effect Yielded by Positioning Waveform Shaping Device at Stage Posterior to Equalizer As described above, the receiving system 700b and the relay device 910b are designed such that the waveform shaping device 100 is positioned at a stage posterior to the equalizer 800. Accordingly, initially, the equalizer 800 extracts a clock signal from a signal received by the receiving system 700b, reproduces the clock, and compensates waveform distortion of the signal. Thereafter, the signal whose waveform distortion has been compensated is subjected to the sharpening process by the waveform shaping device 100 so that the signal rises and falls sharply.

Consequently, even when the equalizer 800 at a former stage cannot sufficiently compensate waveform distortion of the signal (that is, when waveform distortion remains after the distortion compensating process by the equalizer 800), the sharpening process by the waveform shaping device 100 at a later stage causes the signal to rise and fall sharply, so that the waveform distortion can be compensated sufficiently.

Consequently, even in a case where the equalizer 800 at a former stage does not include sufficient number of taps for compensating waveform distortion of a signal, the sharpening process carried out by the waveform shaping device 100 at a later stage sufficiently compensates the waveform distortion. That is, the number of taps in the equalizer 800 (the number of the multiplication sections 802p) is not required to be as large as the number of taps required for a transversal equalizer alone to sufficiently compensate waveform distortion.

Therefore, also by positioning the waveform shaping device 100 at a stage posterior to the equalizer 800, it is possible to downsize the equalizer 800 and make the equalizer 800 less expensive, and to reduce the process load on the equalizer 800.

Further, even in a case where distortion which is so large that a normal transversal equalizer alone cannot sufficiently compensate is caused due to phase distortion, phasing etc., the waveform shaping device 100 in the receiving system 700b and the relay device 910b causes a signal to rise and fall sharply as described above, so that waveform distortion can be compensated.

Further, by positioning the waveform shaping device 100 at a stage posterior to the equalizer 800, the relay device 910b can sufficiently compensate waveform distortion as described above. Consequently, the number of the relay device 910b on the communication path 900 can be smaller than the number of relay devices having no waveform shaping device 100 on the communication path 900. That is, it is possible to reduce the number of relay devices on the communication path 900. This allows reducing costs for providing and maintaining relay devices.

2-8. Modification Example of Configuration Example 2

In the above explanations, the receiving system 700b and the relay device 910b are designed such that the equalizer 800 and the waveform shaping device 100 are adjacent to each other. However, the equalizer 800 and the waveform shaping device 100 are not necessarily adjacent to each other. That is, other device (apparatus) may be provided between the equalizer 800 and the waveform shaping device 100, and a signal from the equalizer 800 may be inputted to the waveform shaping device 100 via the other device. This configuration yields an effect similar to the above effect.

In the above explanations, the receiving system 700b and the relay device 910b are designed to include both of the equalizer 800 and the waveform shaping device 100. Alternatively, the receiving system 700b and the relay device 910b may include a device in which the function of the equalizer 800 and the function of the waveform shaping device 100 are integrated with each other. For example, a signal may be subjected to the distortion compensating process by an equalizer in which the function of the equalizer 800 (clock reproducing function, waveform compensating function) and the function of the waveform shaping device 100 (waveform shaping function) are integrated with each other, before being subjected to the sharpening process. This case yields an effect similar to the above effect.

2-9. Case for Which Configuration Example 2 is Suitable

In a case where a rising part of a received signal is easy to identify, the equalizer 800 can extract a clock signal easily, and carry out the distortion compensating process. Thereafter, the waveform shaping device 100 at a later stage carries out the sharpening process in order to compensate remaining distortion as much as possible. That is, the configuration of the communication system 1000b in which the waveform shaping device 100 is positioned at a stage posterior to the equalizer 800 is suitable for a case where a rising part of a received signal is easy to identify.

Further, in a case where jitters occurring in the communication path 900 are large, subjecting a signal to the sharpening process by the waveform shaping device 100 at a stage posterior to the equalizer 800 causes the signal swaying due to the jitters to rise and fall sharply, resulting in a possibility that the equalizer 800 mistakenly extracts a clock signal. For this reason, the configuration of the communication system 1000b in which the waveform shaping device 100 is positioned at a stage posterior to the equalizer 800 is suitable for a case where jitters occurring in the transmitting path 900 are large.

3. Configuration of Waveform Shaping Device

The following details the configuration of the waveform shaping device 100.

3-1. Configuration Example 1 of Waveform Shaping Device

FIG. 7 is a block diagram showing a configuration of a waveform shaping device 100a. As shown in FIG. 7, the waveform shaping device 100a includes a high frequency component extracting section (low frequency component removing means) 11, a nonlinear process section 102a, and an addition section (addition means) 15.

Initially, an explanation is made as to the high frequency component extracting section 11. Schematically, the high frequency component extracting section 11 extracts a high frequency component in the input signal Sin and outputs the component as a high-frequency signal S11 (low-frequency-free signal). With reference to FIG. 8, an explanation is made as to a configuration of the high frequency component extracting section 11. FIG. 8 is a block diagram showing the configuration of the high frequency component extracting section 11.

As shown in FIG. 8, the high frequency component extracting section 11 includes a filter 110, a rounding process section (low-level signal removing means) 132, and a limiter (high-level signal removing means) 133.

The filter 110 is an m-tap transversal high-pass filter including m−1 unit delay elements 111$h$ (h=1, 2, ..., m−1: m is a positive integer of 3 or greater), m multiplication sections 112$k$ (k=1, 2, ..., m), and an addition section 131. The filter 110 receives the input signal Sin and outputs a high band signal SH1.

Each of the unit delay elements 111$h$ delays an input signal by unit time and outputs the delayed signal. The unit delay element 1111 (h=1) receives the input signal Sin.

Each of the multiplication sections 112$k$ multiplies the input signal with a coefficient Ck, and outputs the result of the multiplication to the addition section 131. The coefficient Ck is set beforehand so that the filter 110 serves as a high-pass filter. For example, in a case where m=3, by setting C1, C2, and C3 to 0.5, −1, and 0.5, respectively, the filter 110 serves as a high-pass filter.

The addition section 131 adds signals from the addition sections 112$k$ so as to generate the high band signal SH1.

As is generally known, a low-pass filter is easier to realize than a high-pass filter is. Therefore, the filter 110 may be constituted of a low-pass filter. FIG. 9 shows another configuration example of the filter 110. As shown in FIG. 9, the filter 110 may be constituted of a low-pass filter 1101 and a subtraction section 1102.

In order not to amplitude noises in the nonlinear process section 102 at a later stage, the rounding process section 132 removes a low level signal which can be regarded as a noise in the high band signal SH1, thereby generating a low-level-free signal SH2.

Specifically, out of signal values of the high band signal SH1, the rounding process section 132 changes a signal value whose absolute value is not more than a predetermined lower limit LV to "0", thereby generating the low-level-free signal SH2.

For example, in a case where the input signal Sin can be any integer ranging from −255 to 255, when the lower limit LV is "2", the rounding process section 132 regards, as noises, all signal values whose absolute value is not more than "2" out of signal values of the high band signal SH1, and changes such signal values to "0" (i.e. rounds such signal values).

Subsequently, in order that a signal already having a sufficiently high energy is not further amplified in the nonlinear process section 102 at a later stage, the limiter 133 removes a high-level signal value in the low-level-free signal SH2, thereby generating a high-frequency signal S11.

Specifically, in order that a signal value of the low-level-free signal SH2 is not more than a predetermined upper limit UV1, with respect to signal values of the low-level-free signal SH2, the limiter 133 carries out a process of changing signal values whose absolute values are more than the upper limit UV1 so that their absolute values are not more than the upper limit UV1 (hereinafter also referred to as a clipping process), thereby generating the high-frequency signal S11.

For example, out of signal values of the low-level-free signal SH2, signal values whose absolute values are more than "64" are changed to "64" or "−64" according to signs. Alternatively, the signal values may be changed to "0".

In a case where the input signal Sin is an 8-bit signal, the filter 110 adds, to the input signal Sin, a signal limited to be not more than 3rdMSB (approximately 64 or −64 in 8-bit signal) based on 12-bit calculation. Accordingly, the rounding process section 132 and the limiter 133 carry out a process of limiting the result of calculation by the filter 110 to 8-bit signals.

In the above explanation, the high-frequency component extracting section 11 includes the rounding process section 132 and the limiter 133. Alternatively, the high-frequency component extracting section 11 may include a member obtained by integrating the rounding process section 132 and the limiter 133 with each other.

Next, the nonlinear process section 102$a$ is to be described. The nonlinear process section 102$a$ includes a nonlinear operation section (even exponentiation operation means) 21, a sign changing section (sign changing means) 41, and a limiter (amplitude adjustment means) 51 (see FIG. 7).

The non-linear operation section 21 carries out a non-linear operation with respect to the high-frequency signal S11, so as to generate a non-linear signal S21.

The nonlinear operation which is carried out by the nonlinear operation section 21 is described here. The following description denotes a signal value to be supplied to the nonlinear operation section 21 as x, denotes a signal value to be supplied from the nonlinear operation section 21 as y, and expresses the nonlinear operation which is carried out by the nonlinear operation section 21 as a function y=f(x).

Assume here that the function f(x) is a nonlinear monotone increasing function which monotonically increases so as to be in positive and negative symmetry (origin symmetry). Note that "monotone increasing" means broad monotone increasing. However, it is only necessary that the function f(x) monotonically increase at least in the vicinity of x="0". It is preferable that the function f(x) be |f(x)|>|x| at least in the vicinity of x="0".

Such a function f(x) is exemplified by those expressed as the following expressions (1) through (3). Note that it is preferable that the functions f(x) expressed as the expressions (2) and (3) be used in an interval 0≦x≦1 since the functions f(x) greatly increase in the interval.

$$f(x)=x^{2n} \text{ (} n \text{ is a natural number)} \quad (1)$$

$$f(x)=|x|^{1/2} \quad (2)$$

$$f(x)=|x|^{1/10} \quad (3)$$

In a case where the expression (1) is used as the function f(x), the nonlinear operation section 21 raises the high-frequency signal S11 to an even exponent not less than 2, so as to generate the nonlinear signal S21 (an even exponentiation signal). For example, in a case where n=1 (i.e., f(x)=$x^2$) in the expression (1), the nonlinear operation section 21 squares the high-frequency signal S11, so as to generate the nonlinear signal S21. Assuming in this case that data rows constituting the high-frequency signal S11 are X1, X2, X3, ..., the nonlinear signal S21 obtained by squaring the high-frequency signal S11 becomes a digital signal constituted by data rows $X1^2$, $X2^2$, and $X3^2$, ....

In a case where a signal value of the high-frequency signal S11 is any of integer values −255 through 255, 255 may be used to normalize x so as to use the function (x). For example, the expression (2) may be replaced with the following expression (4) obtained by using x/255 to normalize x on the right side of the function f(x) expressed as the expression (2) and multiplying the right side by 255. Note that the expression (4) meets the requirement of f(x)>x.

$$f(x)=255|x/255|^{1/2} \quad (4)$$

In the expression (4), 255 is used to normalize x on the right side of the function f(x) expressed as the expression (2) and the right side is multiplied by 255. However, a numerical value by which the right side is multiplied does not need to be identical to a value (255 in this example) to normalize x. It is only necessary that the numerical value meet the requirement of |f(x)|>|x|. For example, the following expression (5) in which the right side is multiplied by 100 instead of 255 may be replaced with the expression (4).

$$f(x)=100|x/255|^{1/2} \quad (5)$$

Further, the function (x) may be expressed as the following expression (6) and use a trigonometric function.

$$f(x)=255|\sin[(x/255)(\pi/2)]| \quad (6)$$

Subsequently, in accordance with sign bit information on the high-frequency signal S11, the sign changing section 41 generates, as a sign change signal S41, a signal obtained by reflecting a sign of the high-frequency signal S11 in the nonlinear signal S21. Namely, the sign changing section 41 retains a sign of a part of the nonlinear signal S21 which part is identical in sign to the high-frequency signal S11. In contrast, the sign changing section 41 reverses positive and negative signs of a part of the nonlinear signal S21 which part is different in sign from the high-frequency signal S11.

Then, the limiter 51 carries out a process (hereinafter also described as an amplitude adjustment process) for adjusting an amplitude (a signal level, an intensity) of the sign change signal S41 which is generated by the sign changing section 41, so as to generate a nonlinear process signal S12. Specifically, the limiter 51 multiplies the sign change signal S41 by a specific magnification value ($|\alpha|<1$), so as to adjust the amplitude of the sign change signal S41. The magnification value α is appropriately set according to characteristics of a communication path.

In order not to further amplify a signal which has sufficient energy and in order to cause a signal value of the nonlinear process signal S12 to be not more than a predetermined upper limit UV2, the limiter 51 carries out a process (hereinafter also described as a clip process) for changing, to a value not more than the upper limit UV2, an absolute value of a part of the nonlinear process signal S12 which part has an absolute value higher than the upper limit UV2. For example, in a case where a part of the nonlinear process signal S12 has a signal value whose absolute value exceeds "64", the limiter 51 changes the signal value to "64" or "−64" in accordance with a sign of the absolute value. Alternatively, the limiter 51 changes the absolute value to "0".

Note that the nonlinear process section 102a may include no limiter 51 that carries out the amplitude adjustment process and the clip process with respect to the sign change signal S41. In this case, the nonlinear process section 102a outputs, as the nonlinear process signal S12, the sign change signal S41 which is generated by the sign changing section 41.

Finally, the addition section 15 is to be described. The addition section 15 adds the nonlinear process signal S12 as a correction signal to the input signal Sin, so as to generate the output signal Sout. Note that the addition section 15 appropriately includes a delay element for adjusting a timing between the input signal Sin and the nonlinear process signal S12.

3-2. Waveform of Signal

The following description discusses waveforms of signals generated by sections of the waveform shaping device 100a with reference to (a) of FIG. 10 through (e) of FIG. 10. (a) of FIG. 10 through (e) of FIG. 10 schematically illustrate the waveforms of the signals generated by the sections of the waveform shaping device 100a. Assume here that the waveform shaping device 100a receives the signal shown in (a) of FIG. 10 as the input signal Sin.

Initially, when the input signal Sin is inputted to the high-frequency component extracting section 11, a high-frequency component included in the input signal Sin is extracted so that the high-frequency signal S11 shown in (b) of FIG. 10 is generated.

Next, in a case where the nonlinear operation which is carried out by the nonlinear operation section 21 of the nonlinear process section 102a is f(x)=x², the nonlinear operation section 21 generates the nonlinear signal S21 obtained by squaring the high-frequency signal S11 (see (c) of FIG. 10).

Subsequently, the sign changing section 41 which has received the nonlinear signal S21 generates the sign change signal 41 (see (d) of FIG. 10). As illustrated in (d) of FIG. 10, the sign change signal S41 retains positive and negative signs of the high-frequency signal S11 (see (b) of FIG. 10).

Then, the limiter 51 which has received the sign change signal S41 carries out the amplitude adjustment process and the clip process, so as to generate the nonlinear process signal S12. Thereafter, the addition section 15 adds the nonlinear process signal S12 to the input signal Sin, so as to generate the output signal Sout (see (e) of FIG. 10).

Note that a rise and a fall of the signal of the nonlinear process signal S12 (see (e) of FIG. 10), which are steeper than those of a signal obtained by enhancing the input signal Sin by use of the linear operation, are to be described with reference to FIG. 11.

The signal shown in (a) of FIG. 11 is identical to the input signal Sin shown in (a) of FIG. 10. In order to enhance the input signal Sin shown in (a) of FIG. 11, a sharpening process using the linear operation uses a method in which a high-frequency signal is extracted from the input signal Sin shown in (a) of FIG. 11 and the input signal Sin is added to the high-frequency signal thus extracted. Therefore, a signal component which is not contained in the input signal Sin and exceeds the Nyquist frequency is not added in the conventional sharpening process using the linear operation.

Consequently, in the sharpening process based on linear operation, a signal shown in (b) of FIG. 11 is generated. Rising of the signal shown in (b) of FIG. 11 is sharper than rising of the input signal Sin shown in (a) of FIG. 11. However, rising of the non-liner process signal S12 ((e) of FIG. 10) generated by the waveform shaping device 100a is further sharper.

3-3. Configuration Example 2 of Waveform Shaping Device

The nonlinear process section 102a may differentiate the nonlinear signal S21 which is generated by the nonlinear operation section 21. This is because differentiation of the nonlinear signal S21 allows removal of a direct-current component contained in the nonlinear operation section 21.

Therefore, a configuration example of the waveform shaping device 100b is to be described with reference to FIG. 12. FIG. 12 is a block diagram illustrating a configuration of the waveform shaping device 100b.

As shown in FIG. 12, the waveform shaping device 100b includes a high-frequency component extracting section 11, a nonlinear process section 102b, and an addition section 15. The nonlinear process section 102b includes not only the configuration of the nonlinear process section 102a shown in FIG. 7 but also a differentiation section (differentiation means) 31 between the nonlinear operation section 21 and the sign converting section 41. The high-frequency component extracting section 11, members other than the differentiation section 31 in the nonlinear process section 102b, and the addition section 15 are the same as those explained above and detailed explanations thereof are omitted here.

The differentiation section 31 differentiates the nonlinear signal S21 generated by the nonlinear operation section 21, thereby generating a differentiation signal S31.

A configuration of the differentiation section 31 is to be described with reference to FIG. 13. FIG. 13 is a block diagram illustrating the configuration of the differentiation section 31. As shown in FIG. 13, the differentiation section 31 includes a unit delay element 3111 and a subtraction section 3112. The differentiation section 31 finds a backward difference with respect to a signal to be supplied to the differentiation section 31.

With respect to the differential signal S31 which has been generated by the differentiation section 31, in accordance with sign bit information on the high-frequency signal S11, the sign changing section 41 generates, as a sign change signal S42, a signal obtained by reflecting a sign of the high-frequency signal S11 in the nonlinear signal S21. Namely, the sign changing section 41 retains a sign of a part of the differential signal S31 which part is identical in sign to the high-frequency signal S11. In contrast, the sign changing section 41 reverses positive and negative signs of a part of the differential signal 31 which part is different in sign from the high-frequency signal S11.

The limiter 51 carries out the amplitude adjustment process and the clip process with respect to the sign change signal S42 which is generated by the sign changing section 41, so as to generate the nonlinear process signal S12. According to the amplitude adjustment process, the sign change signal S42 is multiplied by a predetermined magnification value $\alpha$, so that an amplitude of the sign change signal S42 is adjusted.

Note that the nonlinear process section 102b may include no limiter 51 that carries out the amplitude adjustment process and the clip process with respect to the sign change signal S42. In this case, the nonlinear process section 102b outputs, as the nonlinear process signal S12, the sign change signal S42 which is generated by the sign changing section 41.

3-4. Waveform of Signal

The following explains waveforms of signals generated by sections of the waveform shaping device 100b with reference to (a) to (f) of FIG. 14. (a) to (f) of FIG. 14 schematically show the waveforms of signals generated by sections of the waveform shaping device 100b. Here, it is assumed that a signal shown in (a) of FIG. 14 is inputted as the input signal Sin to the waveform shaping device 100b. The signal shown in (a) of FIG. 14 is the same as the signal shown in (a) of FIG. 10.

Initially, when the input signal Sin is inputted to the high-frequency component extracting section 11, a high-frequency component included in the input signal Sin is extracted so that the high-frequency signal S11 shown in (b) of FIG. 14 is generated.

Subsequently, when nonlinear operation carried out by the nonlinear operation section 21 of the nonlinear process section 102b is based on $f(x)=x^2$, the nonlinear signal S21 obtained by squaring the high-frequency signal S11 is generated by the nonlinear operation section 21 (see (c) of FIG. 14).

Subsequently, when the nonlinear signal S21 is inputted to the differentiation section 31, the differentiation signal S31 shown in (d) of FIG. 14 is generated. It should be noted that the differentiation signal S31 does not include a direct current component which has been included in the nonlinear signal S21.

Subsequently, when the differentiation signal S31 is inputted to the sign converting section 41, the sign-converted signal S42 shown in (e) of FIG. 14 is generated. As shown in (e) of FIG. 14, the sign-converted signal S42 has the same plus and minus signs as those of the high-frequency signal S11 shown in (b) of FIG. 14.

Subsequently, when the sign-converted signal S42 is inputted to the limiter 51, the amplitude regulating process and the clipping process are carried out, so that the nonlinear process signal S12 is generated. Lastly, the addition section 15 adds the nonlinear process signal S12 to the input signal Sin, thereby generating the output signal Sout (see (f) of FIG. 14).

Rising and falling of the output signal Sout shown in (f) of FIG. 14 are sharper than those of a signal sharpened based on linear operation.

3-5. Configuration Example 3 of Waveform Shaping Device

The nonlinear process section 102a and the nonlinear process section 102b explained above include the sign converting section 41. Alternatively, the nonlinear process section of the present invention may be arranged not to include the sign converting section 41 as long as nonlinear operation carried out on the high-frequency signal S11 maintains plus and minus signs of the high-frequency signal S11.

With reference to FIG. 15, the following explains a configuration example of a waveform shaping device 100c which does not include the sign converting section 41. FIG. 15 is a block diagram showing a configuration of the waveform shaping device 100c.

As shown in FIG. 15, the waveform shaping device 100c includes a high-frequency component extracting section 11, a nonlinear process section 102c, and an addition section 15. The nonlinear process section 102c includes a nonlinear operation section (odd exponentiation operation means) 22 and a limiter 51. The high-frequency component extracting section 11, the limiter 51, and the addition section 15 are the same as those explained above and detailed explanations thereof are omitted here.

The nonlinear operation section 22 carries out nonlinear operation on the high-frequency signal S11, thereby generating a nonlinear signal S22.

The nonlinear operation which is carried out by the nonlinear operation section 22 is described here. The following description denotes a signal value to be supplied to the nonlinear operation section 22 as x, denotes a signal value to be supplied from the nonlinear operation section 22 as y, and expresses the nonlinear operation which is carried out by the nonlinear operation section 22 as a function y=g(x).

Assume here that the function g(x) is a nonlinear monotone increasing function which monotonically increases so as to be in positive and negative symmetry (origin symmetry). Note that "monotone increasing" means broad monotone increasing. However, it is only necessary that the function g(x) monotonically increase at least in the vicinity of x="0". It is preferable that the function g(x) be |g(x)|>|x| at least in the vicinity of x="0".

Such a function g(x) is exemplified by that expressed as the following expression (7).

$$g(x)=x^{3n} \text{ (}n\text{ is a natural number)} \tag{7}$$

In a case where the expression (7) is used as the function g(x), the nonlinear operation section 22 raises the high-frequency signal S11 to an odd exponent not less than 3, so as to generate the nonlinear signal S22. For example, in a case where n=1 (i.e., $g(x)=x^3$) in the expression (7), the nonlinear operation section 22 cubes the high-frequency signal S11, so as to generate the nonlinear signal S22. Assuming in this case that data rows constituting the high-frequency signal S11 are X1, X2, X3, . . . , the nonlinear signal S22 obtained by cubing the high-frequency signal S11 becomes a digital signal constituted by data rows $X1^3$, $X2^3$, and $X3^3$, . . . .

The limiter 51 carries out the amplitude adjustment process and the clip process with respect to the nonlinear signal S22 which is generated by the nonlinear operation section 22, so as to generate the nonlinear process signal S12.

Note that the nonlinear process section 102c may include no limiter 51 that carries out the amplitude adjustment process and the clip process with respect to the nonlinear signal S22. In this case, the nonlinear process section 102c outputs, as the nonlinear process signal S12, the nonlinear signal S22 which is generated by the nonlinear operation section 22.

3-6. Waveform of Signal

The following explains waveforms of signals generated by sections of the waveform shaping device 100c with reference to (a) to (d) of FIG. 16. (a) to (d) of FIG. 16 schematically show the waveforms of signals generated by sections of the waveform shaping device 100c. Here, it is assumed that a signal shown in (a) of FIG. 16 is inputted as the input signal Sin to the waveform shaping device 100c. The signal shown in (a) of FIG. 16 is the same as the signal shown in (a) of FIG. 10.

Initially, when the input signal Sin is inputted to the high-frequency component extracting section 11, a high-frequency component included in the input signal Sin is extracted so that the high-frequency signal S11 shown in (b) of FIG. 16 is generated.

Subsequently, when nonlinear operation carried out by the nonlinear operation section 22 is $g(x)=x^3$, the nonlinear signal S22 obtained by raising the high-frequency signal S11 to the third power is generated by the nonlinear operation section 22 (see (c) of FIG. 16).

Subsequently, when the nonlinear signal S22 is inputted to the limiter 51, the amplitude regulating process and the clipping process are carried out, so that the nonlinear process signal S12 is generated. Lastly, the addition section 15 adds the nonlinear process signal S12 to the input signal Sin, thereby generating the output signal Sout (see (d) of FIG. 16).

Rising and falling of the output signal Sout shown in (d) of FIG. 16 are sharper than those of a signal sharpened based on linear operation.

3-7. Reason why Frequency Higher than Nyquist Frequency is Generated

The following explains why the output signal Sout generated by the waveform shaping device 100 includes a high-frequency component higher than Nyquist frequency fs/2, such as a harmonic wave component included in the input signal Sin.

Here, it is assumed that the input signal Sin is represented by a function F(x) where x represents a time. When a base angular frequency of the input signal Sin is ω, the function F(x) can be represented by formula (8) below which is a Fourier series.

$$F(x) = a_{-N}\cos(-N)\omega x + a_{-N+1}\cos(-N+1)\omega x + \ldots + a_{-1}\cos(-1)\omega x + a_0 + a_1\cos\omega x + a_2\cos 2\omega x + \ldots + a_N\cos N\omega x + b_{-N}\sin(-N)\omega x + b_{-N+1}\sin(-N+1)\omega x + \ldots + b_{-1}\sin(-1)\omega x + b_1\sin\omega x + b_2\sin 2\omega x + \ldots + b_N\sin N\omega x \quad (8)$$

In the expression (8), N is a degree of a higher harmonic wave having a maximum frequency which does not exceed the Nyquist frequency fs/2 with respect to the sampling frequency fs. Namely, the following expression (9) is met.

$$N\omega/(2\pi) < fs/2 \leq (N+1)\omega/(2\pi) \quad (9)$$

Next, in a case where a signal of the input signal Sin expressed as the function F(x) other than a direct-current component $a_0$ is denoted as G(x), G(x) is expressed as the following expression (10).

$$G(x) = a_{-N}\cos(-N)\omega x + a_{-N+1}\cos(-N+1)\omega x + \ldots + a_{-1}\cos(-1)\omega x + a_1\cos\omega x + a_2\cos 2\omega x + \ldots + a_N\cos N\omega x + b_{-N}\sin(-N)\omega x + b_{-N+1}\sin(-N+1)\omega x + \ldots + b_{-1}\sin(-1)\omega x + b_1\sin\omega x + b_2\sin 2\omega x + \ldots + b_N\sin N\omega x \quad (10)$$

Here, the input signal Sin inputted to the waveform shaping device 100 includes a signal G(x) or a high-frequency component of the signal G(x).

For example, in a case where the nonlinear operation section 21 carries out the nonlinear operation of $f(x)=x^2$, the nonlinear operation section 21 generates the nonlinear signal S21 by squaring the high-frequency signal S11. Note here that each term of $(G(x))^2$ is expressed as any of the following expressions (11) through (13) based on the expression (10) (i=±1, ±2, ±N; j=±1, ±2, ±N).

$$a_i \cos i\omega x \cdot a_j \cos j\omega x \quad (11)$$

$$a_i \cos i\omega x \cdot b_j \sin j\omega x \quad (12)$$

$$b_i \sin i\omega x \cdot b_j \sin j\omega x \quad (13)$$

Note here that the expressions (11) through (13) can be rewritten to the following respective expressions (14) through (16) by use of trigonometric formulae.

$$(a_i a_j/2)\{\cos(i+j)\omega x + \cos(i-j)\omega x\} \quad (14)$$

$$(a_i b_j/2)\{\sin(i+j)\omega x - \sin(i-j)\omega x\} \quad (15)$$

$$(-b_i b_j/2)\{\cos(i+j)\omega x + \cos(i-j)\omega x\} \quad (16)$$

$(G(x))^2$ contains angular frequency components such as (N+1)ω, (N+2)ω, . . . , and 2Nω) (see the expressions (14) through (16)).

Accordingly, $(G(x))^2$ contains a frequency component which is higher than the Nyquist frequency fs/2. Namely, the nonlinear signal S21 which is generated by the nonlinear operation section 21 contains a frequency component which is higher than the Nyquist frequency fs/2 such as a harmonic component having a frequency of 2Nω/(2π).

Similarly, for example, in a case where the nonlinear operation section 22 carries out the nonlinear operation of $g(x)=x^3$, the nonlinear operation section 22 generates the nonlinear signal S22 by cubing the high-frequency signal S11. Note here that each term of $(G(x))^3$ is expressed as any of the following expressions (17) through (20) based on the expression (10) (i=±1, ±2, . . . , ±N; j=±1, ±2, . . . , ±N).

$$a_i \cos i\omega x \cdot a_j \cos j\omega x \cdot a_k \cos k\omega x \quad (17)$$

$$a_i \cos i\omega x \cdot a_j \cos j\omega x \cdot b_k \sin k\omega x \quad (18)$$

$$a_i \cos i\omega x \cdot b_j \sin j\omega x \cdot b_k \sin k\omega x \quad (19)$$

$$b_i \sin i\omega x \cdot b_j \sin j\omega x \cdot b_k \sin k\omega x \quad (20)$$

Note here that, in a case where attention is paid to terms in which i=j=k=N and which are expressed as the expressions (17) and (20), these terms can be rewritten to the following respective expressions (21) and (22) by use of trigonometric formulae.

$$(a_N \cos N\omega x)^3 = a_N{}^3\{(\tfrac{3}{4})\cos N\omega x + (\tfrac{1}{4})\cos 3N\omega x\} \quad (21)$$

$$(b_N \cos N\omega x)^3 = bN^3\{(\tfrac{3}{4})\sin N\omega x - (\tfrac{1}{4})\sin 3N\omega x\} \quad (22)$$

For example, in a case where attention is paid to terms in which i=j=k=−N and which are expressed as the expressions (17) and (20), these terms can be rewritten to the following respective expressions (23) and (24) by use of trigonometric formulae.

$$\{a_N \cos(-N\omega x)\}^3 = a_N{}^3\{(\tfrac{3}{4})\cos(-N\omega x) + (\tfrac{1}{4})\cos(-3N\omega x)\} \quad (23)$$

$$\{b_N \sin(-N\omega x)\}^3 = b_N{}^3\{(\tfrac{3}{4})\sin(-N\omega x) - (\tfrac{1}{4})\sin(-3N\omega x)\} \quad (24)$$

$(G(x))^3$ contains a frequency component which is 3N times a base angular frequency ω and a frequency component which is −3N times the base angular frequency ω (see the expressions (21) through (24)). The expressions (21) through (24) show that, in a case where the other terms of $(G(x))^3$ are rewritten by use of trigonometric formulae, $(G(x))^3$ contains various frequency components which range from 3N times to −3N times the base angular frequency ω.

Accordingly, $(G(x))^3$ contains a frequency component which is higher than the Nyquist frequency fs/2. Namely, the nonlinear signal S22 which is generated by the nonlinear operation section 22 contains a frequency component which is higher than the Nyquist frequency fs/2 such as a harmonic component having a frequency of 3Nω/(2π).

As described above, the output signal Sout generated by the waveform shaping device 100 includes a high frequency component which is not included in the input signal Sin, i.e. a frequency component whose frequencies are higher than the Nyquist frequency.

4. Modification Examples

4-1. Other Configuration Example 1 of Waveform Shaping Device

There are many kinds of nonlinear operation carried out by the waveform shaping device 100 other than those explained above. With reference to FIGS. 17 and 18, the following explains configuration examples of a waveform shaping device 100d and a waveform shaping device 100e.

Initially, FIG. 17 is a block diagram showing a configuration of the waveform shaping device 100d. As shown in FIG. 17, the waveform shaping device 100d includes a high frequency component extracting section 11, a nonlinear process section 102d, and an addition section 15. The high-frequency component extracting section 11 and the addition section 15 are the same as those explained above and detailed explanations thereof are omitted here.

The nonlinear process section 102d includes a square operation section 61, a first differentiation section 71, a second differentiation section 81, and a multiplication section 91.

The square operation section 61 squares the high-frequency signal S11, thereby generating a square signal S61. That is, when data rows constituting the high-frequency signal S11 are X1, X2, X3, ..., the square signal S61 obtained by squaring the high-frequency signal S11 is a digital signal constituted by data rows $X1^2, X2^2, X3^2, \ldots$.

Subsequently, the first differentiation section 71 differentiates the square signal S61 generated by the square operation section 61, thereby generating a first differentiation signal S71. The configuration of the first differentiation section 71 is the same as that of the differentiation section 31 for example.

Subsequently, the second differentiation section 81 differentiates the input signal Sin, thereby generating a second differentiation signal S81. The configuration of the second differentiation section 81 is the same as that of the differentiation section 31 for example.

Subsequently, the multiplication section 91 multiplies the first differentiation signal S71 with the second differentiation signal S81, thereby generating a nonlinear process signal S12. That is, when data rows constituting the first differentiation signal S71 are U1, U2, U3, ... and data rows constituting the second differentiation signal S81 are V1, V2, V3, ..., the nonlinear process signal S12 is a digital signal constituted by data rows U1·V1, U2·V2, U3·V3, ....

In the configuration explained above, there is provided the square operation section 61 in order to carry out nonlinear operation. Alternatively, there may be used a fourth power operation section which raises the high-frequency signal S11 to the fourth power. More generally, there may be used an exponentiation operation section which generates a signal obtained by raising the high-frequency signal S11 to an even exponent not less than 2.

4-2. Other Configuration Example 2 of Waveform Shaping Device

The waveform shaping device 100d explained above includes the square operation section 61. Alternatively, the waveform shaping device may include, instead of the square operation section 61, an absolute value operation section 62 which calculates the absolute value of an input signal.

Accordingly, with reference to FIG. 18, the following explains a waveform shaping device 100e including the absolute value process section 62. FIG. 18 is a block diagram showing a configuration of the waveform shaping device 100e.

As shown in FIG. 18, the waveform shaping device 100e includes a high frequency component extracting section 11, a nonlinear process section 102e, and an addition section 15. The high-frequency component extracting section 11 and the addition section 15 are the same as those explained above and detailed explanations thereof are omitted here.

The nonlinear process section 102e includes the absolute value process section 62, a first differentiation section 71, a second differentiation section 81, and a multiplication section 91. The first differentiation section 71, the second differentiation section 81, and the multiplication section 91 are the same as those explained above and detailed explanations thereof are omitted here.

The absolute value process section 62 generates an absolute value signal S62 which is a signal whose values correspond to absolute values of the high-frequency signal S11. That is, when data rows constituting the high-frequency signal S1 are X1, X2, X3, ..., the absolute value signal S62 is a digital signal constituted by data rows |X1|, |X2|, |X3|, ....

Subsequently, the first differentiation section 71 differentiates the absolute value signal S62 generated by the absolute value process section 62, thereby generating a first differentiation signal S72.

Subsequently, the multiplication section 91 multiplies the first differentiation signal S72 with the second differentiation signal S81, thereby generating a nonlinear process signal S12.

5. Additional Notes

Lastly, functions of the waveform shaping device 100, the equalizer 800, the receiving system 700, and the relay device 910 may be realized by hardware logic or may be realized by software by using CPUs (central processing units) as described below.

In the case where the functions of the waveform shaping device 100, the equalizer 800, the receiving system 700, and the relay device 910 are realized by software, the waveform shaping device 100 (in particular, the high-frequency component extracting section 11, the nonlinear process section 102, and the addition section 15), the equalizer 800, the receiving system 700, and the relay device 910 include: CPUs for executing a program for realizing the functions; ROMs (read only memory) that store the program; RAMs (random access memory) that develop the program; storage devices (storage mediums) in which the program and various data are stored; and the like. The object of the present invention can be realized in such a manner that the waveform shaping device 100, the equalizer 800, the receiving system 700, and the relay device 910 are provided with a computer-readable storage medium for storing program codes (such as executable program, intermediate code program, and source program) of control programs of the waveform shaping device 100, the equalizer 800, the receiving system 700, and the relay device 910 which programs serve as software for realizing the functions, and a computer (alternatively, CPU or MPU) reads out and executes the program codes stored in the storage medium.

The storage medium is, for example, tapes such as a magnetic tape and a cassette tape, or discs such as magnetic discs (e.g. a Floppy Disc® and a hard disc), and optical discs (e.g. CD-ROM, MO, MD, DVD, and CD-R). Further, the storage medium may be cards such as an IC card (including a memory card) and an optical card, or semiconductor memories such as mask ROM, EPROM, EEPROM, and flash ROM.

Further, the waveform shaping device 100, the equalizer 800, the receiving system 700, and the relay device 910 may be arranged so as to be connectable to a communication network so that the program code is supplied to the waveform shaping device 100, the equalizer 800, the receiving system 700, and the relay device 910 through the communication network. The communication network is not particularly limited. Examples of the communication network include the Internet, intranet, extranet, LAN, ISDN, VAN, CATV communication network, virtual private network, telephone network, mobile communication network, and satellite communication network. Further, a transmission medium that constitutes the communication network is not particularly limited. Examples of the transmission medium include (i) wired lines such as IEEE 1394, USB, power-line carrier, cable TV lines, telephone lines, and ADSL lines and (ii) wireless connections such as IrDA and remote control using infrared ray, Bluetooth®, IEEE 802.11, HDR, mobile phone network, satellite connections, and terrestrial digital network. Note that the present invention can be also realized by the program codes in the form of a computer data signal embedded in a carrier wave, which is the program that is electrically transmitted.

As described above, means used herein indicates not only physical means but also a case where functions of individual means are realized by software. The function of one means may be realized by two or more physical means or the functions of two or more means may be realized by one physical means.

As described above, the waveform shaping device of the present invention is a waveform shaping device which shapes a waveform of an externally input signal and outputs the input signal with the shaped waveform as an output signal to distortion compensation means, positioned outside, for compensating a distortion of a signal, the waveform shaping device including: low-frequency component removing means for removing at least a direct current component from frequency components of the input signal so as to generate a low-frequency-free signal; nonlinear process means for generating a nonlinear process signal (i) in which positive and negative signs of the low-frequency-free signal are retained and (ii) which broadly monotonically increases nonlinearly with respect to the low-frequency-free signal when values of the low-frequency-free signal are at least in the vicinity of 0; and addition means for adding the nonlinear process signal to the input signal so as to generate the output signal.

Further, a method of the present invention of controlling a waveform shaping device is a method of controlling a waveform shaping device which shapes a waveform of an externally input signal and outputs the input signal with the shaped waveform as an output signal to distortion compensation means, positioned outside, for compensating a distortion of a signal, the method including the steps of: removing at least a direct current component from frequency components of the input signal so as to generate a low-frequency-free signal; generating a nonlinear process signal (i) in which positive and negative signs of the low-frequency-free signal are retained and (ii) which broadly monotonically increases nonlinearly with respect to the low-frequency-free signal when values of the low-frequency-free signal are at least in the vicinity of 0; and adding the nonlinear process signal to the input signal so as to generate the output signal.

Consequently, a signal obtained by subjecting a high-frequency component in an input signal to a nonlinear process can be generated as an output signal, and the generated output signal can be outputted to the distortion compensation means positioned outside for compensating a distortion of a signal. The output signal includes a high-frequency signal which has not been included in an original frequency component. As a result, the generated output signal includes a frequency component whose frequencies are higher than the Nyquist frequency which is the half of a sampling frequency when the input signal is made discrete. Therefore, the waveform shaping device of the present invention can cause rising and falling of a signal which correspond to edges of an input signal to be steeper than a process in which an input signal is subjected to linear operation.

Here, it is assumed that the input signal inputted to the waveform shaping device is a signal transmitted from a transmission device via a transmission path and is a signal on which a clock signal is overlapped. Further, it is assumed that the distortion compensation means provided outside which is a destination of the output signal is an equalizer which includes a general transversal linear filter and which carries out a process of extracting a clock signal from the output signal and reproducing a clock and a process of compensating waveform distortion of a signal due to transmission properties of the transmission path.

In this case, even when a rising part of the clock signal included in the input signal is difficult to be identified, the waveform shaping device makes rising and falling of a transmission signal steeper. Accordingly, the equalizer at a later stage can reproduce an accurate clock having rising and falling with accurate timing. When the clock can be reproduced accurately, the number of taps in the equalizer may be smaller than that of a case where waveform distortion is compensated only by a transversal equalizer.

Accordingly, the present invention yields an effect of downsizing distortion compensation means at a stage posterior to a waveform shaping device and making the distortion compensation means less expensive, and reducing a process load on the equalizer.

In order to solve the foregoing problem, the waveform shaping device of the present invention is a waveform shaping device which shapes a waveform of an input signal from distortion compensation means positioned outside for compensating a distortion of a signal and outputs the input signal with the shaped waveform as an output signal, the waveform shaping device including: low-frequency component removing means for removing at least a direct current component from frequency components of the input signal so as to generate a low-frequency-free signal; nonlinear process means for generating a nonlinear process signal (i) in which positive and negative signs of the low-frequency-free signal are retained and (ii) which broadly monotonically increases nonlinearly with respect to the low-frequency-free signal when values of the input signal are at least in the vicinity of 0; and addition means for adding the nonlinear process signal to the low-frequency-free signal so as to generate the output signal.

Further, in order to solve the foregoing problem, the method of the present invention of controlling a waveform shaping device is a method of controlling a waveform shaping device which shapes a waveform of an input signal from distortion compensation means positioned outside for compensating a distortion of a signal and outputs the input signal with the shaped waveform as an output signal, the method including the steps of: removing at least a direct current component from frequency components of the input signal so as to generate a low-frequency-free signal; generating a nonlinear process signal (i) in which positive and negative signs of the low-frequency-free signal are retained and (ii) which broadly monotonically increases nonlinearly with respect to the low-frequency-free signal when values of the low-frequency-free signal are at least in the vicinity of 0; and adding the nonlinear process signal to the input signal so as to generate the output signal.

Accordingly, a signal obtained by subjecting a high-frequency component in an input signal from the distortion compensation means provided outside to a nonlinear process can be outputted as an output signal.

Here, it is assumed that a signal whose distortion is compensated by the distortion compensation means provided outside is a signal transmitted from a transmission device via a transmission path and is a signal on which a clock signal is overlapped. Further, it is assumed that the distortion compensation means provided outside is an equalizer which includes a general transversal linear filter and which carries out a process of extracting a clock signal from the output signal and reproducing a clock and a process of compensating waveform distortion of a signal due to transmission properties of the transmission path.

In this case, even when the equalizer serving as the distortion compensation means provided at a stage prior to the waveform shaping device cannot sufficiently compensate waveform distortion of a signal (i.e. when waveform distortion remains after the distortion compensation process), the waveform shaping device at the later stage makes rising and falling of the signal steeper, so that the waveform distortion can be compensated sufficiently.

Consequently, even in a case where the equalizer serving as the distortion compensation means does not include sufficient number of taps for compensating waveform distortion of a signal, the waveform shaping device at a later stage can sufficiently compensate the waveform distortion. That is, the number of taps in the equalizer serving as the distortion compensation means is not required to be as large as the number of taps required for a transversal equalizer alone to compensate waveform distortion.

Accordingly, the present invention yields an effect of downsizing distortion compensation means at a stage prior to a waveform shaping device and making the distortion compensation means less expensive, and reducing a process load on the distortion compensation means.

The waveform shaping device of the present invention may be arranged such that the nonlinear process means includes: even exponentiation operation means for generating an even exponentiation signal by raising the low-frequency-free signal to an even exponent not less than 2; and sign changing means for generating the nonlinear process signal by reversing positive and negative signs of a part of the even exponentiation signal which part is different in sign from the low-frequency-free signal.

With the arrangement, the low-frequency-free signal is raised to an even exponent not less than 2 so as to generate the even exponentiation signal, and signs of the even exponentiation signal which signs are opposite to signs of the frequency component before the exponentiation are inverted so as to generate the nonlinear process signal.

The low-frequency-free signal is raised to an even exponent not less than 2 to generate the even exponentiation signal, and plus and minus signs of the even exponentiation signal are made the same as those of the low-frequency-free signal before the exponentiation operation so as to generate a nonlinear process signal. Accordingly, an output signal obtained by adding the low-frequency-free signal and the non-liner process signal includes a high frequency component which has not been included in the low-frequency-free signal (i.e. has not been included in the input signal).

Accordingly, the present invention yields an effect that rising and falling of a signal which correspond to edges of an input signal can be made steeper, compared with a method of subjecting an input signal to linear operation.

The waveform shaping device of the present invention may be arranged such that the nonlinear process means includes: even exponentiation operation means for generating an even exponentiation signal by raising the low-frequency-free signal to an even exponent not less than 2; differentiation means for generating a differential signal by differentiating the even exponentiation signal; and sign changing means for generating the nonlinear process signal by reversing positive and negative signs of a part of the differential signal which part is different in sign from the low-frequency-free signal.

With the arrangement, the low-frequency-free signal is raised to an even exponent not less than 2 so as to generate the even exponentiation signal, the even exponentiation signal is differentiated to generate the differentiation signal, and signs of the differentiation signal which signs are opposite to signs of the low-frequency-free signal before the exponentiation are inverted so as to generate the nonlinear process signal.

Consequently, the low-frequency-free signal is raised to an even exponent not less than 2, a direct current component which may be included in the resulting signal is differentiated and removed, and the nonlinear process signal is generated while having the same plus and minus signs as those of the low-frequency-free signal before the exponentiation. Accordingly, the output signal obtained by adding the low-frequency-free signal and the nonlinear process signal includes a frequency component which has not been included in the low-frequency-free signal (i.e. has not been included in the input signal).

Accordingly, the present invention yields an effect that rising and falling of a signal which correspond to edges of an input signal can be made steeper, compared with a method of subjecting an input signal to linear operation. Further, since a direct current component which may be included in a signal having been subjected to exponentiation is removed, rising and falling of a signal can be made steeper, compared with a case where a direct current component included which may be included in a signal having been subjected to exponentiation is not removed.

The waveform shaping device of the present invention may be arranged such that the nonlinear process means includes odd exponentiation operation means for generating the nonlinear process signal by raising the low-frequency-free signal to an odd exponent not less than 3.

With the arrangement, the low-frequency-free signal is raised to an odd exponent not less than 3 so as to generate the nonlinear process signal.

Since the low-frequency-free signal is raised to an odd exponent not less than 3 so as to generate the nonlinear process signal, the output signal obtained by adding the low-frequency-free signal and the nonlinear process signal includes a frequency component which has not been included in the low-frequency-free signal (i.e. has not been included in the input signal).

Accordingly, the present invention yields an effect that rising and falling of a signal which correspond to edges of an input signal can be made steeper, compared with a method of subjecting an input signal to linear operation.

The waveform shaping device of the present invention may be arranged such that the nonlinear process means further includes amplitude adjustment means for adjusting an amplitude of the nonlinear process signal by multiplying the amplitude by a predetermined magnification value.

With the arrangement, the output signal obtained by adding the low-frequency-free signal and the nonlinear process signal can be regulated to have appropriate amplitude. This yields an effect of preventing the output signal from having too much large amplitude.

The waveform shaping device of the present invention may be arranged such that when the values of the low-frequency-free signal are around 0, the nonlinear process means generates the nonlinear process signal so that the nonlinear process signal has an absolute value larger than that of the low-frequency-free signal.

With the arrangement, when the values of the low-frequency-free signal are around 0, the nonlinear process signal is generated so that the nonlinear process signal has an absolute value larger than that of the low-frequency-free signal.

Consequently, at an area where the low-frequency-free signal is around 0, the nonlinear process signal to be added to the low-frequency-free signal when generating the output signal can be larger than the low-frequency-free signal.

Accordingly, the present invention yields an effect that rising and falling of a signal which correspond to edges of an input signal can be made steeper at an area where the low-frequency-free signal is around 0.

The waveform shaping device of the present invention may be arranged such that the low-frequency component removing means is a high-pass filter having 3 or more taps.

With the arrangement, since the low-frequency component removing means is a high-pass filter having 3 or more taps, the low-frequency component removing means can appropriately remove at least a direct current component from the input signal.

Consequently, when a direct current component is removed from the input signal so as to generate the low-frequency-free signal and the low-frequency-free signal is subjected to the nonlinear process so as to generate the nonlinear process signal, the output signal obtained by adding the nonlinear process signal and the low-frequency-free signal includes a high frequency component which has not been included in the low-frequency-free signal (i.e. has not been included in the input signal).

Accordingly, the present invention yields an effect that rising and falling of a signal which correspond to edges of an input signal can be made steeper, compared with a method of subjecting an input signal to linear operation.

The waveform shaping device of the present invention may be arranged such that the low-frequency component removing means further includes: low-level signal removing means for changing, out of signal values of the low-frequency-free signal, signal values whose absolute values are lower than a predetermined lower limit to 0, and high-level signal removing means for changing, out of the signal values of the low-frequency-free signal, signal values whose absolute values are higher than a predetermined upper limit in such a manner that the absolute values are not higher than the predetermined upper limit while maintaining signs of that signal values.

With the arrangement, out of signal values of the low-frequency-free signal, signal values whose absolute values are lower than a predetermined lower limit are changed to 0, and out of the signal values of the low-frequency-free signal, signal values whose absolute values are higher than a predetermined upper limit are changed in such a manner that the absolute values are not higher than the predetermined upper limit while maintaining signs of that signal values.

With the arrangement, a noise included in the low-frequency-free signal can be removed, and a high frequency component with large energy included in the low-frequency-free signal can be prevented from being amplified by the nonlinear process.

This yields an effect that also in the output signal, a noise is removed and a high frequency component with large energy can be prevented from being amplified.

An equalizer of the present invention includes: the aforementioned waveform shaping device; and distortion compensation means for compensating a distortion of the output signal from the waveform shaping device or distortion compensation means for compensating a distortion of a signal so as to generate a distortion compensation signal and outputting the distortion compensation signal as the input signal to the waveform shaping device.

With the arrangement, the equalizer includes (A) the waveform shaping device and the distortion compensation means for compensating an output signal from the waveform shaping device or (B) the distortion compensation means for compensating a distortion of a signal so as to generate a distortion compensation signal and the waveform shaping device which receives the distortion compensation signal as an input signal.

Here, it is assumed that the input signal inputted to the waveform shaping device is a signal transmitted from a transmission device via a transmission path and is a signal on which a clock signal is overlapped. Further, it is assumed that the distortion compensation means includes a general transversal linear filter and carries out a process of extracting a clock signal from the transmission signal and reproducing a clock and a process of compensating waveform distortion of a signal due to transmission properties of the transmission path.

In this case, with the arrangement (A), even when a rising part of the clock signal included in the input signal is difficult to be identified, the waveform shaping device makes rising and falling of the clock signal which correspond to edges of the input signal steeper. Accordingly, the distortion compensation means at a later stage can reproduce an accurate clock having rising and falling with accurate timing. When the clock can be reproduced accurately, the distortion compensation means can sufficiently compensate waveform distortion even when the number of taps in the distortion compensation means may be small. That is, accurately reproducing a clock enables making the number of taps in the distortion compensation means smaller than that of a case where waveform distortion is compensated only by a transversal equalizer.

On the other hand, with the arrangement (B), even when the distortion compensation means at a former stage cannot sufficiently compensate waveform distortion of the signal (that is, when waveform distortion remains after the distortion compensating process by the distortion compensation means), rising and falling of a signal can be made steeper by the waveform shaping device at a later stage, so that the waveform distortion can be compensated sufficiently.

Consequently, even when the distortion compensation means at a former stage is a liner filter having insufficient number of taps for compensating waveform distortion of a signal, the waveform shaping device at a later stage can sufficiently compensate the waveform distortion. That is, the number of taps in the distortion compensation means may be smaller than the number of taps required for a transversal equalizer alone to compensate waveform distortion.

Accordingly, each of the arrangements (A) and (B) can downsize the equalizer, make the equalizer less expensive, and reduce a process load on the equalizer.

A receiving system of the present invention includes: the aforementioned waveform shaping device; and an equalizer which includes distortion compensation means for compensating a distortion of the output signal from the waveform shaping device or distortion compensation means for compensating a distortion of a signal so as to generate a distortion compensation signal and outputting the distortion compensation signal as the input signal to the waveform shaping device.

With the arrangement, the receiving system includes (C) the waveform shaping device and the equalizer including the distortion compensation means for compensating an output signal from the waveform shaping device or (D) the equalizer including the distortion compensation means for compensating a distortion of a signal so as to generate a distortion compensation signal and the waveform shaping device which receives the distortion compensation signal as an input signal.

Here, it is assumed that the input signal inputted to the receiving system is a signal transmitted from a transmission device via a transmission path and is a signal on which a clock signal is overlapped. Further, it is assumed that the distortion compensation means in the equalizer includes a general transversal linear filter and carries out a process of extracting a clock signal from the transmission signal and reproducing a clock and a process of compensating waveform distortion of a signal due to transmission properties of the transmission path.

In this case, with the arrangement (C), even when a rising part of the clock signal included in the input signal is difficult to be identified, the waveform shaping device makes rising and falling of the clock signal which correspond to edges of the input signal steeper. Accordingly, the equalizer at a later stage can reproduce an accurate clock having rising and falling with accurate timing. When the clock can be reproduced accurately, the distortion compensation means can sufficiently compensate waveform distortion even when the number of taps in the equalizer may be small. That is, accurately reproducing a clock enables making the number of taps in equalizer smaller than that of a case where waveform distortion is compensated only by a transversal equalizer.

On the other hand, with the arrangement (D), even when the equalizer at a former stage cannot sufficiently compensate waveform distortion of the signal (that is, when waveform distortion remains after the distortion compensating process by the equalizer), rising and falling of a signal can be made steeper by the waveform shaping device at a later stage, so that the waveform distortion can be compensated sufficiently.

Consequently, even when the equalizer at a former stage is a liner filter having insufficient number of taps for compensating waveform distortion of a signal, the waveform shaping device at a later stage can sufficiently compensate the waveform distortion. That is, the number of taps in the equalizer may be smaller than the number of taps required for a transversal equalizer alone to compensate waveform distortion.

Accordingly, each of the arrangements (C) and (D) can downsize the equalizer, make the equalizer less expensive, and reduce a process load on the equalizer.

The waveform shaping device and the equalizer may be realized by a computer. In this case, the present invention encompasses control programs for the waveform shaping device and the equalizer which cause a computer to function as the aforementioned sections so as to realize the waveform shaping device and the equalizer by the computer, and a computer-readable medium in which the control programs are recorded.

The present invention is not limited to the description of the embodiments above, but may be altered by a skilled person within the scope of the claims. An embodiment based on a proper combination of technical means disclosed in different embodiments is encompassed in the technical scope of the present invention.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

The present invention is applicable to digital communication devices. In particular, the present invention is preferably applicable to communication devices such as relay devices and receiving devices on communication paths via which digital communications are carried out.

REFERENCE SIGNS LIST

11. High frequency component extracting section (low-frequency component removing means)
15. Addition section (addition means)
21. Nonlinear operation section (even exponentiation operation means)
22. Non-liner operation section (odd exponentiation operation means)
31. Differentiation section (differentiation means)
41. Sign converting section (sign converting means)
51. Limiter (amplitude adjustment means)
100, 100a-100e. Waveform shaping device
102, 102a-102e. Nonlinear process section (nonlinear process means)
132. Rounding process section (low-level signal removing means)
133. Limiter (high-level signal removing means)
700, 700a, 700b. Receiving system
800. Equalizer (distortion compensation means provided outside)

Sin. Input signal
Sout. Output signal
S11. High-frequency signal (low-frequency-free signal)
S12. Nonlinear process signal
S21. Nonlinear signal (even exponentiation signal)
S22. Nonlinear signal
S31. Differentiation signal

The invention claimed is:

1. A waveform shaping device, which shapes a waveform of an externally input signal and outputs the input signal with the shaped waveform as an output signal to distortion compensation means, positioned outside, for compensating a distortion of a signal,
said waveform shaping device comprising:
low-frequency component removing means for removing at least a direct current component from frequency components of the input signal so as to generate a low-frequency-free signal;
nonlinear process means for generating a nonlinear process signal (i) in which positive and negative signs of the low-frequency-free signal are retained and (ii) which broadly monotonically increases nonlinearly with respect to the low-frequency-free signal when values of the low-frequency-free signal are at least in the vicinity of 0; and
addition means for adding the nonlinear process signal to the input signal so as to generate the output signal.

2. The waveform shaping device as set forth in claim 1, wherein
the nonlinear process means includes:
even exponentiation operation means for generating an even exponentiation signal by raising the low-frequency-free signal to an even exponent not less than 2; and
sign changing means for generating the nonlinear process signal by reversing positive and negative signs of a part of the even exponentiation signal which part is different in sign from the low-frequency-free signal.

3. The waveform shaping device as set forth in claim 1, wherein
the nonlinear process means includes:
even exponentiation operation means for generating an even exponentiation signal by raising the low-frequency-free signal to an even exponent not less than 2;
differentiation means for generating a differential signal by differentiating the even exponentiation signal; and
sign changing means for generating the nonlinear process signal by reversing positive and negative signs of a part of the differential signal which part is different in sign from the low-frequency-free signal.

4. The waveform shaping device as set forth in claim 1, wherein the nonlinear process means includes odd exponentiation operation means for generating the nonlinear process signal by raising the low-frequency-free signal to an odd exponent not less than 3.

5. The waveform shaping device as set forth in claim 1, wherein the nonlinear process means further includes amplitude adjustment means for adjusting an amplitude of the nonlinear process signal by multiplying the amplitude by a predetermined magnification value.

6. The waveform shaping device as set forth in claim 1, wherein when the values of the low-frequency-free signal are around 0, the nonlinear process means generates the nonlinear process signal so that the nonlinear process signal has an absolute value larger than that of the low-frequency-free signal.

7. The waveform shaping device as set forth in claim 1, wherein the low-frequency component removing means is a high-pass filter having 3 or more taps.

8. The waveform shaping device as set forth in claim 1, wherein
the low-frequency component removing means further includes:
low-level signal removing means for changing, out of signal values of the low-frequency-free signal, signal values whose absolute values are lower than a predetermined lower limit to 0, and
high-level signal removing means for changing, out of the signal values of the low-frequency-free signal, signal values whose absolute values are higher than a predetermined upper limit in such a manner that the absolute values are not higher than the predetermined upper limit while maintaining signs of that signal values.

9. A receiving system, comprising:
a waveform shaping device as set forth in claim 1; and
an equalizer which includes distortion compensation means for compensating a distortion of the output signal from the waveform shaping device or distortion compensation means for compensating a distortion of a signal so as to generate a distortion compensation signal and outputting the distortion compensation signal as the input signal to the waveform shaping device.

10. An equalizer, comprising:
a waveform shaping device as set forth in claim 1; and
distortion compensation means for compensating a distortion of the output signal from the waveform shaping device or distortion compensation means for compensating a distortion of a signal so as to generate a distortion compensation signal and outputting the distortion compensation signal as the input signal to the waveform shaping device.

11. A control program for causing a computer included in an equalizer as set forth in claim 10 to operate, the control program causing the computer to function as sections of the equalizer.

12. A computer-readable medium in which a control program as set forth in claim 11 is recorded.

13. A control program for causing a computer included in a waveform shaping device as set forth in claim 1 to operate, the control program causing the computer to function as sections of the waveform shaping device.

14. A computer-readable medium in which a control program as set forth in claim 13 is recorded.

15. A waveform shaping device, which shapes a waveform of an input signal from distortion compensation means positioned outside for compensating a distortion of a signal and outputs the input signal with the shaped waveform as an output signal,
said waveform shaping device comprising:
low-frequency component removing means for removing at least a direct current component from frequency components of the input signal so as to generate a low-frequency-free signal;
nonlinear process means for generating a nonlinear process signal (i) in which positive and negative signs of the low-frequency-free signal are retained and (ii) which broadly monotonically increases nonlinearly with respect to the low-frequency-free signal when values of the low-frequency-free signal are at least in the vicinity of 0; and
addition means for adding the nonlinear process signal to the input signal so as to generate the output signal.

16. The waveform shaping device as set forth in claim 15, wherein
the nonlinear process means includes:
even exponentiation operation means for generating an even exponentiation signal by raising the low-frequency-free signal to an even exponent not less than 2; and
sign changing means for generating the nonlinear process signal by reversing positive and negative signs of a part of the even exponentiation signal which part is different in sign from the low-frequency-free signal.

17. The waveform shaping device as set forth in claim 15, wherein
the nonlinear process means includes:
even exponentiation operation means for generating an even exponentiation signal by raising the low-frequency-free signal to an even exponent not less than 2;
differentiation means for generating a differential signal by differentiating the even exponentiation signal; and
sign changing means for generating the nonlinear process signal by reversing positive and negative signs of a part of the differential signal which part is different in sign from the low-frequency-free signal.

18. The waveform shaping device as set forth in claim 15, wherein the nonlinear process means includes odd exponentiation operation means for generating the nonlinear process signal by raising the low-frequency-free signal to an odd exponent not less than 3.

19. The waveform shaping device as set forth in claim 15, wherein the nonlinear process means further includes amplitude adjustment means for adjusting an amplitude of the nonlinear process signal by multiplying the amplitude by a predetermined magnification value.

20. The waveform shaping device as set forth in claim 15, wherein when the values of the low-frequency-free signal are around 0, the nonlinear process means generates the nonlinear process signal so that the nonlinear process signal has an absolute value larger than that of the low-frequency-free signal.

21. The waveform shaping device as set forth in claim 15, wherein the low-frequency component removing means is a high-pass filter having 3 or more taps.

22. The waveform shaping device as set forth claim 15, wherein
the low-frequency component removing means further includes:
low-level signal removing means for changing, out of signal values of the low-frequency-free signal, signal values whose absolute values are lower than a predetermined lower limit to 0, and
high-level signal removing means for changing, out of the signal values of the low-frequency-free signal, signal values whose absolute values are higher than a predetermined upper limit in such a manner that the absolute values are not higher than the predetermined upper limit while maintaining signs of that signal values.

23. A receiving system, comprising:
a waveform shaping device as set forth in claim 15; and
an equalizer which includes distortion compensation means for compensating a distortion of the output signal from the waveform shaping device or distortion compensation means for compensating a distortion of a signal so as to generate a distortion compensation signal and outputting the distortion compensation signal as the input signal to the waveform shaping device.

24. An equalizer, comprising:
a waveform shaping device as set forth in claim 15; and
distortion compensation means for compensating a distortion of the output signal from the waveform shaping device or distortion compensation means for compensating a distortion of a signal so as to generate a distortion compensation signal and outputting the distortion compensation signal as the input signal to the waveform shaping device.

25. A control program for causing a computer included in an equalizer as set forth in claim 24 to operate, the control program causing the computer to function as sections of the equalizer.

26. A computer-readable medium in which a control program as set forth in claim 25 is recorded.

27. A control program for causing a computer included in a waveform shaping device as set forth in claim 15 to operate, the control program causing the computer to function as sections of the waveform shaping device.

28. A computer-readable medium in which a control program as set forth in claim 27 is recorded.

29. A method of controlling a waveform shaping device which shapes a waveform of an externally input signal and outputs the input signal with the shaped waveform as an output signal to distortion compensation means, positioned outside, for compensating a distortion of a signal,
said method comprising the steps of:
removing at least a direct current component from frequency components of the input signal so as to generate a low-frequency-free signal;
generating a nonlinear process signal (i) in which positive and negative signs of the low-frequency-free signal are retained and (ii) which broadly monotonically increases nonlinearly with respect to the low-frequency-free signal when values of the low-frequency-free signal are at least in the vicinity of 0; and
adding the nonlinear process signal to the input signal so as to generate the output signal.

30. A method of controlling a waveform shaping device which shapes a waveform of an input signal from distortion compensation means positioned outside for compensating a distortion of a signal and outputs the input signal with the shaped waveform as an output signal,
said method comprising the steps of:
removing at least a direct current component from frequency components of the input signal so as to generate a low-frequency-free signal;
generating a nonlinear process signal (i) in which positive and negative signs of the low-frequency-free signal are retained and (ii) which broadly monotonically increases nonlinearly with respect to the low-frequency-free signal when values of the low-frequency-free signal are at least in the vicinity of 0; and
adding the nonlinear process signal to the input signal so as to generate the output signal.

* * * * *